United States Patent [19]

Connelly

[11] 4,222,874
[45] Sep. 16, 1980

[54] BALANCED PRESSURE TUBULAR MOLECULAR FILTRATION SYSTEM

[76] Inventor: Robert F. Connelly, Akasaka, P.O. Box 101, Tokyo 107-91, Japan

[21] Appl. No.: 808,195

[22] Filed: Jun. 20, 1977

[30] Foreign Application Priority Data

Dec. 9, 1976 [JP] Japan ................... 51/148274

[51] Int. Cl.² ................... B01D 31/00; B01D 13/00
[52] U.S. Cl. ................... 210/650; 210/652; 210/321 R; 210/323 R; 210/409; 210/433 M
[58] Field of Search ............. 210/433 M, 23 H, 23 F, 210/321 R, 409, 500 M, 323 R

[56] References Cited

U.S. PATENT DOCUMENTS

| | | | |
|---|---|---|---|
| 3,022,187 | 2/1962 | Eyraud et al. | 210/500 M X |
| 3,228,877 | 1/1966 | Mahon | 210/22 |
| 3,712,473 | 1/1973 | Ellenburg | 210/433 M X |
| 3,768,660 | 10/1973 | Block | 210/321 |
| 3,880,755 | 4/1975 | Thomas et al. | 210/433 M X |
| 4,021,350 | 5/1977 | Koslowski | 210/433 M X |
| 4,032,454 | 6/1977 | Hoover et al. | 210/433 M X |

OTHER PUBLICATIONS

Leightell, "RO-How it Works, What it Costs", from *Filtration & Separation*, Dec. 1971, pp. 715-718.

*Primary Examiner*—Frank A. Spear, Jr.
*Attorney, Agent, or Firm*—Spensley, Horn, Jubas & Lubitz

[57] ABSTRACT

A balanced pressure tubular molecular filtration (Reverse Osmosis or Ultra Filtration) system in which semipermeable membranes are cast on or inserted into internal passages of a semiporous tubular substrate, and may also be cast on or affixed to the external surface of said semiporous tubular substrate, said tubular substrate also having one or more low pressure passages for collecting permeate water passing through said semiporous membranes, said tubular substrate being installed in a pressure vessel and operated in such a way that its external surface and all of its internal membrane coated passages are exposed to operating pressure, so that mechanical forces are in balance, thereby overcoming hoop stress and burst strength problems common to internal pressure tubular molecular filtration designs.

17 Claims, 35 Drawing Figures

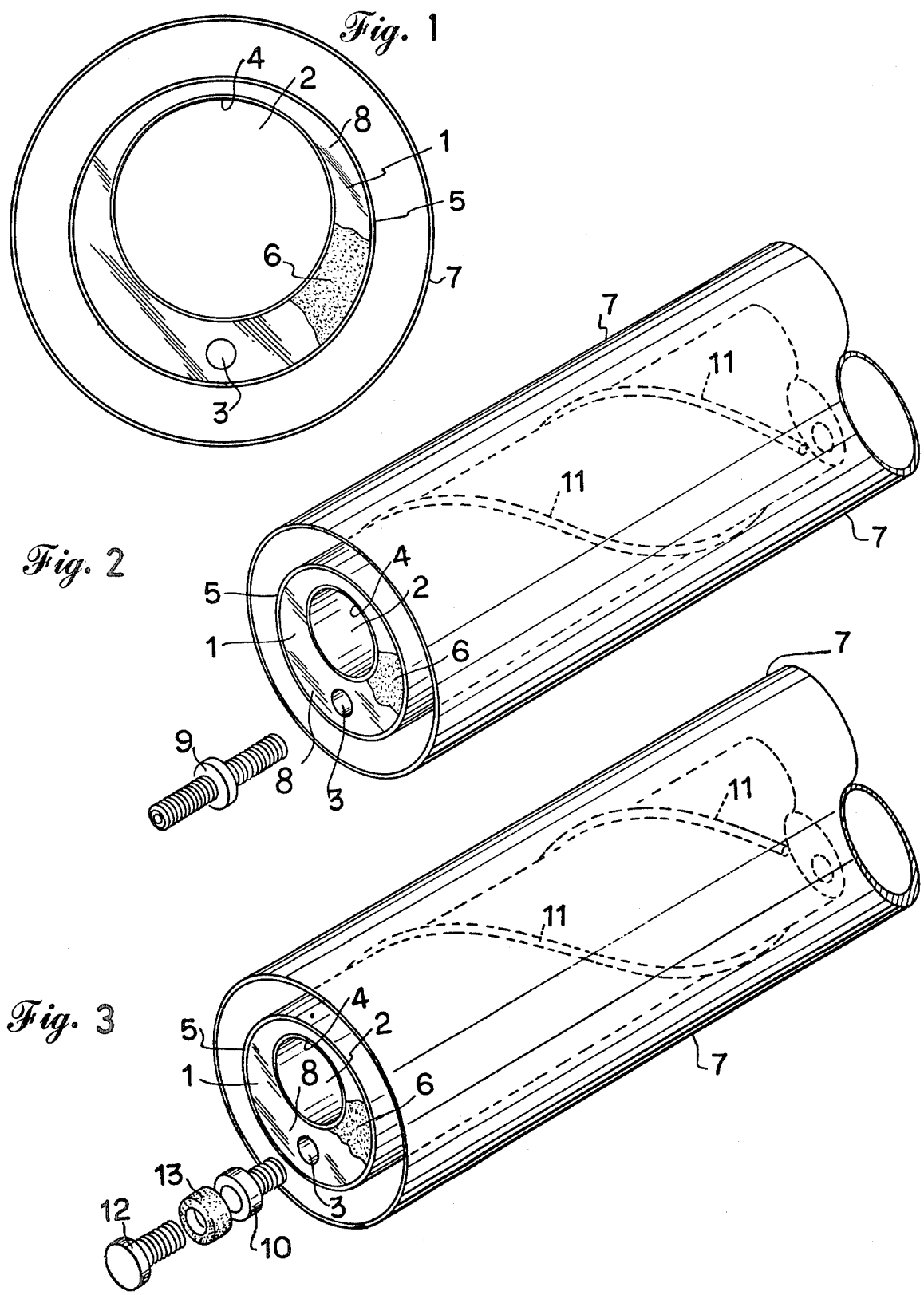

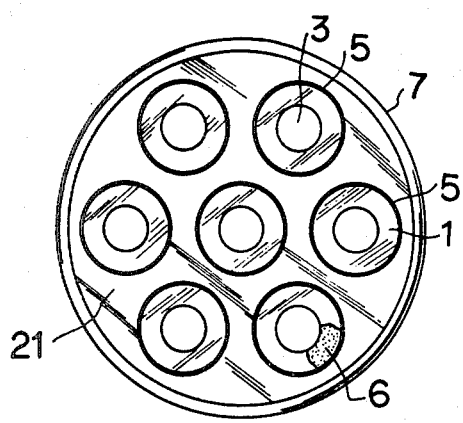
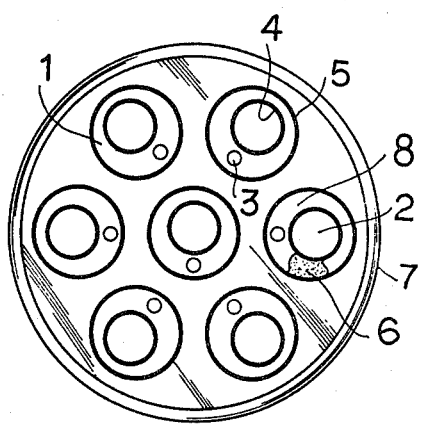
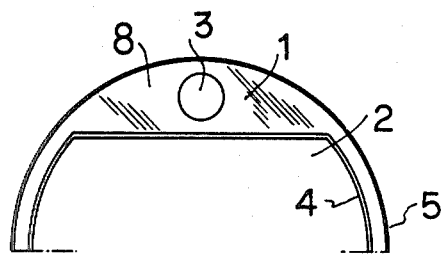
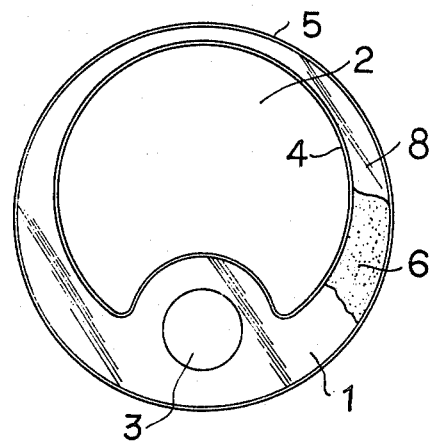
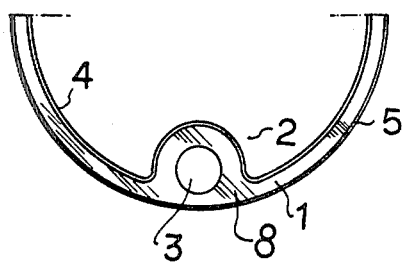

*Fig.* 19
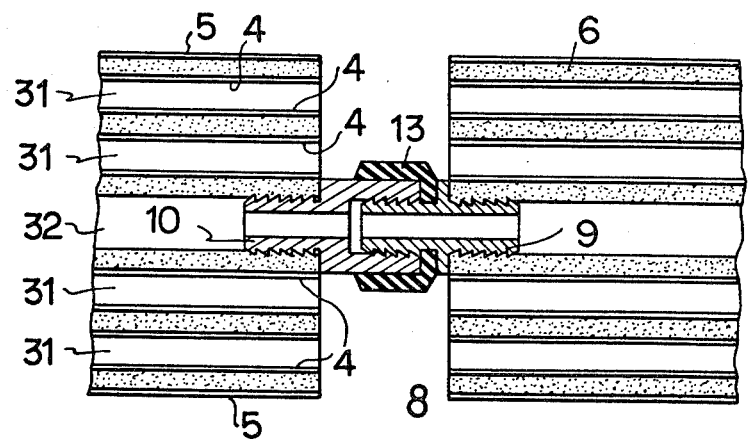
*Fig.* 21
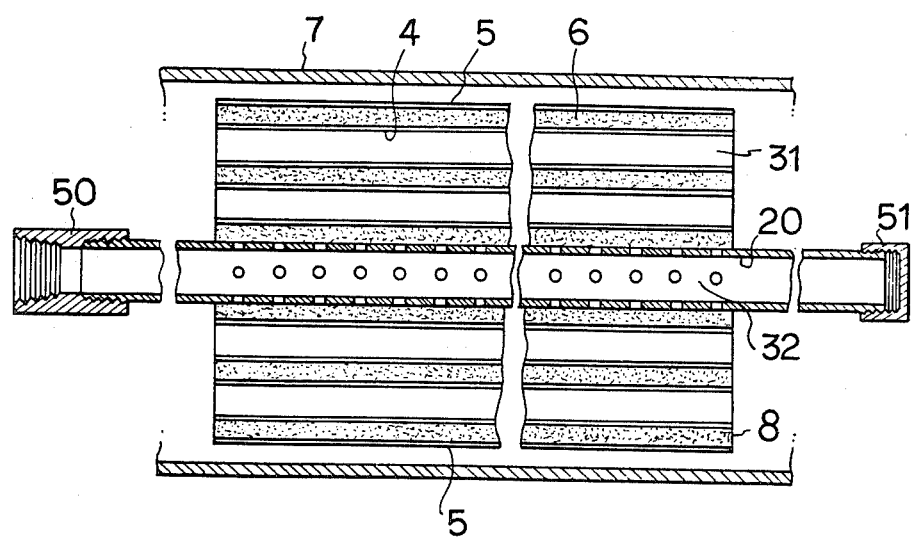

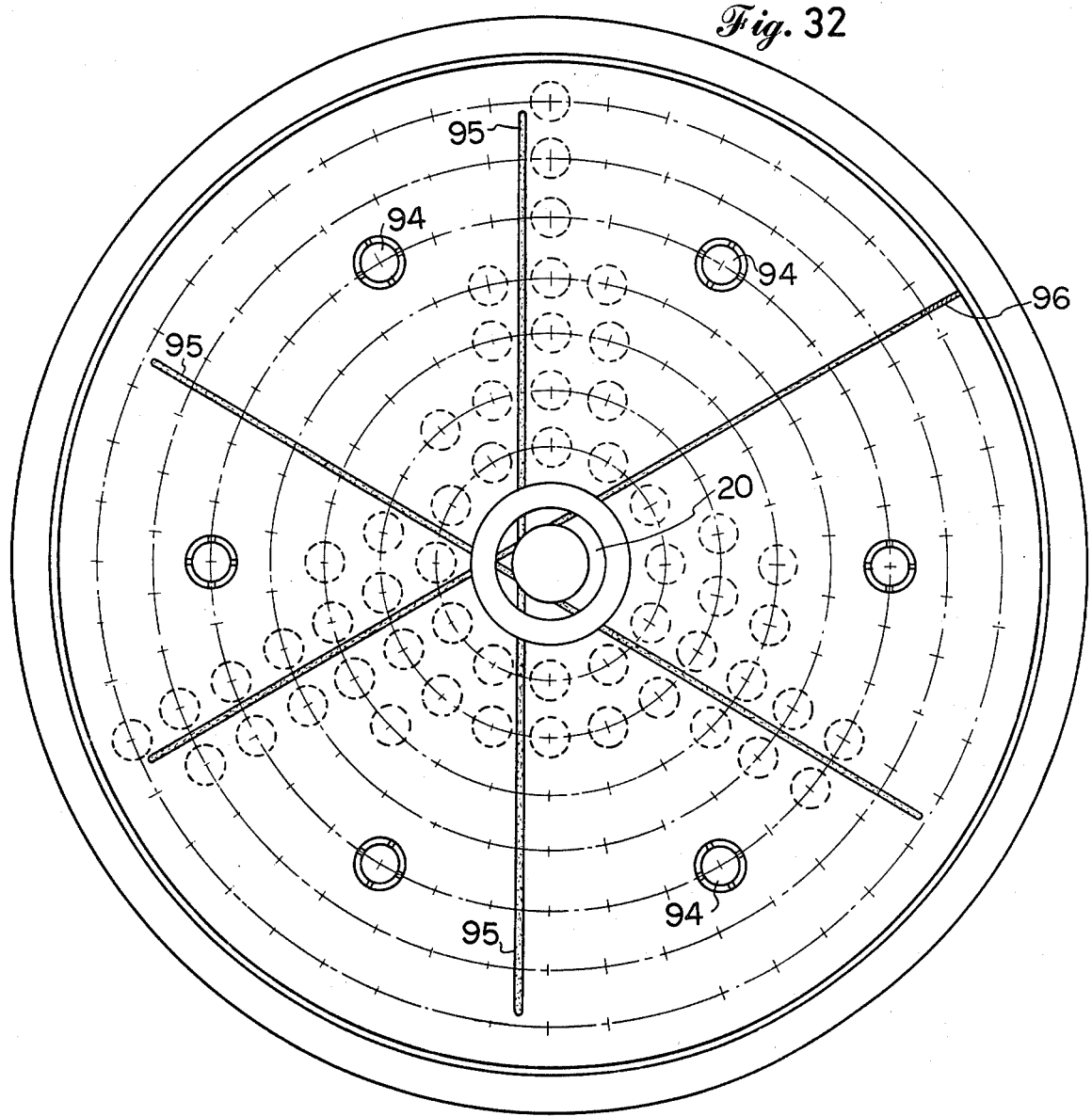

BALANCED PRESSURE TUBULAR MOLECULAR FILTRATION SYSTEM

BACKGROUND OF THE INVENTION

1. Field of the Invention

This invention relates to the fields of (I) pollution control, (II) water supply and (III) product separation and recovery.

2. Description of the Prior Art

I. In the field of pollution control, it more particularly relates to the treatment of mixed industrial waste waters, segregated industrial waste streams, packing house wastes, fish processing wastes, chemical and petrochemical wastes, mining wastes, metal finishing wastes, water base paint wastes, nuclear wastes, photographic film processing wastes, and general sewage wastes.

Specific examples from the field of Pollution control include the following:

1. In the case of segregated industrial waste streams, metal finishing and paint wastes, this invention makes it possible to reconcentrate these segregated wastes in such a way that they may be returned to the industrial process stream, thereby recovering valuable materials. Examples of this type of application include the recovery of metal phosphates from corrosion proofing processes (e.g. Parkerizing) chromic acid, nickel sulfamate, nickel fluoborate, copper pyrophosphate, zinc chloride and similar substances from plating rinse solutions, (R-18, C-9, C-15, C-17, C-18, C-19) and the recovery of latex, emulsion and electro-deposited paint residues from paint rinse and spray booth waters. (C-9, C-15, C-17 & C-18)

(All references are to literature listed in the BIBLIOGRAPHY OF KNOWN PRIOR ART hereinbelow.)

2. In the field of pulp and paper, it permits the recovery and reuse of processing waters, the removal of color and BOD causing constituents, the recovery and concentration of by-products such as polysaccharides and lignosulfonates. (R-1, R-3, R-17, R-21, C-3, C-15, C-17, C-18)

3. In the field of nuclear wastes, it permits the recovery and concentration of dissolved radioactive substances from laundry water, floor washing solutions, boiler blow-down water and any other solutions containing dissolved radioactive substances. (C-15, C-17, C-18) It also permits the recycling of high quality water for further uses, such as in laundry facilities at nuclear installations.

4. In the case of the treatment of general sewage wastes, it permits the production of high quality, essentially bacteria and virus free water, with a low concentration of total dissolved solids (TDS) and virtually no suspended solids (SS), suitable for virtually any type of re-use. (R-13, R-23)

II. In the field of water supply, it relates to the production of potable water from sea water, brackish water and industrial wastes. It has also been used to produce high quality industrial water for specialized purposes such as boiler make-up, semiconductor manufacture, use in nuclear reactor test and operation, pharmaceutical manufacture and other applications requiring very low levels of suspended solids and total dissolved solids. It has also been employed in the re-use and recycling of industrial process waters, permitting "closed drain" operations. (R-1, R-2, R-3, R-4, R-9, R-10, R-13, R-14, R-15, R-19, R-20, R-21, R-22, C-1, C-2, C-3, C-5, C-6, C-7, C-8, C-12, C-14, C-15, C-16, C-17, C-18)

III. In addition to recovery of substances from segregated industrial wastes, mentioned under I, above, specific examples of product separation, concentration and recovery include the following:

1. Chemical product separation and recovery. (R-17)
2. Fermentation product separation and recovery. (R-17)
3. Treatment of whey from cheese and cottage cheese manufacture, permitting the recovery, separation and purification of proteins, amino acids, lactic acid and sugars. (R-3, R-17, C-4, C-11)
4. Extraction of protein from soybean and other vegetable protein products. (R-17, C-4)
5. Concentration of skimmed milk. (R-17, C-4)
6. Concentration of citrus, pineapple and other juices. (R-17)
7. Treatment of soft and alcoholic beverage streams. (R-17)
8. The recovery of water soluble oils, emulsions and synthetic coolants from metal working waste waters. (C-5, C-10, C-15, C-16, C-17, C-18)

GENERAL BACKGROUND OF THE INVENTION

This invention relates more particularly to the field of Molecular Filtration. Molecular filtration is frequently subdivided into two fields, Reverse Osmosis (RO) and Ultra Filtration (UF). Hereinafter "Molecular Filtration" will be referred to simply as "RO", and no separate reference made to Ultra Filtration unless specifically applicable.

In RO, an aqueous liquid is divided into two separate streams, a "permeate," which is substantially free of the dissolved substance (solute) to be controlled or recovered, and a "concentrate," which contains the majority of said substance. (R-1, R-2, R-3, R-4, R-5, R-9, R-10, R-13, R-14, R-15, R-16, R-23)

This type of separation is accomplished by use of a semi-permeable membrane. In all practical methods for employing said membrane, the fluid to be treated is pressurized to a pressure substantially above the osmotic pressure of the feed solution and passed across a substantial area of said membrane. During its transport across said membrane, water molecules preferentially pass through the membrane, with a small, limited amount of the dissolved substances also passing through.

The amount of dissolved substances passing through said membrane is dependent upon numerous factors including (1) the nature of the membrane and its pretreatment, (2) the pressure and temperature, (3) pH, (4) the size and charge of the ions or molecules in solution and (5) the turbulence of the solution adjacent to the membrane. A large amount of specific data on the preferential passage or rejection of certain ionic or molecular species is known to those skilled in the art. (R-1, R-2, R-3)

As said transport continues, the concentration of the dissolved solids in the feed solution increases until the residual solution passes through a pressure controlling valve and emerges from the RO machine. This residual solution is called "final concentrate" or, simply, "concentrate".

The limit of concentration of the final concentrate is dependent upon numerous factors, the most important of which relate to the maximum achievable concentration of the substances in solution, (saturation concentration) and the nature of solids once formed. However, in most commercial RO devices, the practical limit is considerably less than the saturation level, due to the fact that a preferential increase in the concentration of dissolved solids occurs at the membrane surface. This preferential concentration increase is often referred to as "Concentration Polarization". It results from the fact that water from the stagnant boundary layer passes though the membrane, increasing the concentration of solids in the residual liquid. Concentration Polarization is worst under conditions of laminar flow. It can be minimized by increasing the linear velocity or turbulence in the immediate vicinity of the membrane surface. It has been found that, at linear velocities of 0.38 M/sec or above, or at Reynold's numbers of 5,000 or more, the thickness of the stagnant boundary layer in contact with the membrane substantially decreases, thereby providing a major reduction in concentration polarization. For particularly intractible solutions, further improvement can be achieved by increasing the linear velocity to 1.5 M/sec or above or the Reynold's number to 20,000 or more. By such a reduction of boundary layer, solutions can be enriched to a final concentration closely approaching the saturation level of the least stable substances in solution, while, at the same time, minimizing membrane fouling, scaling and similar deleterious phenomena, with attendant loss of productivity and potential membrane compaction, (which results in permanent loss of productivity or total destruction of the membrane.) (R-1, R-2, R-3, R-4, R-5, R-6, R-7, R-8, R-9, R-10, R-11, R-12, R-14, R-15)

The most commonly used RO membranes are manufactured from selected cellulose acetate resins. Other membranes include ethyl cellulose, polysulfone and composite membranes with, for example, ethyl cellulose overlying polysulfone.

In the classical method for the fabrication of cellulose acetate membranes, a solution of the resin in one or more water soluble organic solvents is spread on a flat surface, such as a glass plate, and a doctor blade is drawn over the surface, thereby producing a layer of resin solution with uniform thickness. After several minutes of evaporation in the air, the plate is then lowered into ice water and left there until the resin gels and the water soluble organic solvents are leached from the membrane.

As produced, these membranes have a very low tendency to reject substances in solution. To achieve increased rejection, the membrane is next placed in a bath of hot water for a prescribed period of time. Considerable literature is available on the temperature-time relationship and its effect upon the solute rejection characteristics of the heat treated membrane. (R-1, R-2, R-3, R-16) Casting techniques are also taught by Loeb (PJ-1, PA-1, 2, 3, 4 & 5), Mahon (JP-2) and Merten (JP-3).

It is known that any flexing, bending or embossing of the membrane after casting, causes it to lose productivity or "flux", normally expressed as gallons per square foot per day, or tons ($M^3$) per square meter per day. In his early work, Dr. Sidney Loeb (PA-1) discovered that, if he mounted his cellulose acetate membranes over high quality laboratory filter paper in his test holder, they would, nonetheless, lose flux due to embossment over the fibers in the paper; if, on the other hand, he mounted them over smooth Millipose Type HA filter membranes, their productivity was preserved. Therefore, it is beneficial to cast membranes directly on a rigid substrate, and to employ them without removal therefrom. It is also important to protect them from stretching due to the expansion of the surface on which they are mounted. (R-2)

There are five basic types of commercial RO devices in use at this time. They may be classified as follows:
1. Flat sheet devices
   a. Single sheet devices, largely for laboratory applications, as taught by Loeb (PA-1).
   b. Plate and frame or multiplate devices as taught by Loeb (PA-1), Huggins (PJ-4), Cahn (PJ-5), Strand (PJ-6), Hanzawa (PJ-7), Donokos (PJ-8), and Conners (PJ-9).
2. Hollow Fiber, as taught by Mahon (PJ-10) and Geory (PJ-11) and practiced by Du Pont. (C-2) (R-19, R-20)
3. Spiral Module devices in which flat membranes, with the required separators and spacers, are rolled into a cylindrical form, as taught by Merten (PJ-12, and 13, PA-6), Michaels (PJ-14), Westmoreland (PA-7), Bray (PA-8 and PJ-15) and Shirokawa (PJ-16), and as practiced by Universal Oil Products, Eastman Chemical and Envirogenycs Div. of Aerojet General Corp. (R-3, R-20, R-21) (C-1)
4. Internal pressure tubular designs, as taught by Signa (PJ-17) and Loeb (PA-9), and as practiced by Universal Oil Products (formerly Havens Int'l.,) Abcor, Patterson-Candy, Westinghouse, Union Carbide, Universal Water Corporation, Philco-Ford, Aerojet-General. (C-3, C-4, C-5, C-6, C-7, C-8, C-9, C-10, C-11, C-12, R-9, R-14, R-3, R-21, R-23)
5. External Pressure Tubular designs as taught by Shippey (PA-10), Block (PA-11, PJ-18 & 19), Saito (PJ-20) and Baldon (PJ-21), and as practiced by Rev-O-Pak, Inc., Subsidiary of Raypak, Inc. and Sumitomo Heavy Industries. (R-22, C-13, C-14, C-15, C-16, C-17, C-18, C-19, C-21)

Comparative characteristics of devices described above:

Regarding No. 1, plate and frame equipment is limited in size due to the fact that the high operating pressures over even moderate cross sections, require extremely large bolts and tensioning members. It is also difficult to control external leakage. The membrane is, however, maintained in its original flat condition, though the support medium often causes embossing.

In radioactive applications, flat sheets of membrane may be disposed of with ease. However, the small treating capacity of these devices eliminates them from consideration for the treatment of most nuclear facility wastes.

Regarding No. 2, in the hollow fiber technique, minute capillaries of a semipermeable substance are mounted in a fiber wound pressure vessel, with the open ends of the capillaries penetrating through a header of epoxy or other encapsulating resin. When the solution is pumped through the pressure vessel, portions of the fluid penetrate the walls of the capillaries and pass down the internal passages to the permeate chamber. With a reasonable flow rate through the capillaries, a large back pressure develops. This back pressure may be as much as 200 psi (13.3 kg/cm$^2$) at the midpoints of the fibers. Inasmuch as the maximum working pressure for the glass fiber pressure vessels used in hollow fiber devices is 600 psi (40 kg/cm$^2$), this phenomenon results in a 33% loss in working pressure at these points, or a net working pressure of only 400 psi (26.7 kg/cm$^2$).

This phenomenon is known as "parisitic pressure loss". Since the osmotic pressure of many solutions exceeds 400 psi (26.7 kg/cm$^2$), the applications for this technique are reduced. In addition, the flow of feed solution through the pressure vessel is rather slow and largely laminar. As a result, these devices are very sensitive to fouling by suspended solids and by scale forming substances. Feed solutions must be extensively prefiltered, and scale forming minerals (calcium, magnesium, iron) removed prior to treating with hollow fiber RO devices. In potable water service, broken fibers can permit microorganisms to enter the water supply.

Due to its sensitivity to scale forming substances (calcium and magnesium), and their limited pressure capability, hollow fiber devices are not suited to single pass desalination of sea water. They may, however, be employed as a second stage, following some other RO device.

Large systems require complex arrays of modules, arranged in parallel-series configurations, with costly and complex high pressure manifolding.

With respect to the problem of treating radioactive wastes, the hollow fiber devices suffer from the fact that the glass fiber reinforcement in the pressure vessels yields a high inorganic ash, thereby increasing the volume of waste which must be disposed of.

Regarding No. 3, the spiral module technique employs membranes which are cast as flat sheets but are subsequently rolled, causing disruption of some of the membrane structure. Also, in service they become embossed upon the supporting layers of fabrics and screen, further reducing their desirable characteristics. There are also stagnation zones between the leaves of membranes, in which concentration polarization occurs. Further, suspended solids tend to build up on membrane surfaces, especially on the leading edge of the leaves of the spirals. In order to minimize the effects of suspended and dissolved solids, frequent reverse flow cleaning cycles are required. Costly valving is required in order to provide the reverse flow cleaning capability.

Spiral modules also experience parisitic pressure drop. Further, internal leakage paths in the seals between individual modules in the same pressure vessel result in the leakage of concentrate into the permeate stream.

Due to the limited upper pressure capability and the high osmotic pressure of sea water, spiral module devices cannot ordinarily produce potable water (500 ppm TDS maximum) from sea water in a single pass. Normally it is necessary to employ two separate systems, each with its own booster pump, high pressure pump, cell bank, back pressure regulator, back wash system and instrumentation, for each stage of a sea water treating spiral module system. In many cases, it is also necessary to remove hardness minerals by use of an ion exchange resin prior to the first stage of spiral module treatment.

With respect to the problem of treating radioactive wastes, the spiral module devices suffer from the fact that they contain metalic screens, spacers and other parts which add to the bulk of the final ash. Glass fiber fabrics, employed in some designs, further add to the ash which must be disposed of.

Large systems require complex arrays of modules arranged in parallel-series configurations, with costly and complex high pressure manifolding. This requirement results from boundary layer phenomena and hydraulic considerations, which impose a narrow range of suitable flow rates for spiral modules.

Regarding No. 4, in internal pressure tubular RO devices a membrane is cast on or inserted into the inner surface of a porous tube. The tubing is subjected to internal pressure, with resultant hoop stress, causing the membrane to be stretched, permanently degrading its performance. These tubes can also rupture, causing catastrophic failure of the entire RO system, an intolerable condition for potable water and sewage application. As practiced commercially, several of these tubes are installed in parallel, pressed tightly between two headers, so the finished assembly resembles a heat exchanger tube bundle. These headers are maintained in place against the high fluid pressure by installing a tension rod between them, transmitting an objectionable compressional load to the membrane tubes in the "at rest" condition. However, under operating pressure, the load balance changes, resulting in a stress change on the membranes and tubes. Those stress changes induce fatiguing of the membranes and of the porous tubes. Further, there are high stress concentrations in the immediate area of the header, which affect the life of the tubes and the membrane. Pressures in most internal pressure designs are limited to 800 psi (53.3 kg/cm$^2$).

As mentioned under spiral modules, due to the limited maximum pressure of internal pressure tubular RO, it is usually necessary to employ two stages for sea water desalination. However, these devices are considerably less sensitive to hardness minerals than spiral module devices.

With respect to the problem of treating nuclear wastes, most internal pressure devices present a serious disposal problem. The fiberglas employed in the tubes and the outer shell, the metal headers, tensioning rods, pipe fittings and other mineral and metalic accessories, create a particularly difficult disposal problem. Certain devices also employ large quantities of sand between the tubes, further complicating disposal problems.

In order to minimize some of these deficiencies of internal pressure devices, Patterson-Candy has employed costly perforated stainless steel supports around their membranes, which membranes are inserted therein in the form of a "soda straw", with a membrane film on the inner surface thereof. Maximum pressures are limited to 1,200 psi (80 kg/cm$^2$). This design also employs large amounts of costly stainless steel in its headers and end pieces, greatly escalating the manufacturing costs.

As mentioned under hollow fiber and spiral module, above, large systems require complex and costly high pressure manifolding to establish the proper flow rates in the several stages of series-parallel systems.

Regarding No. 5, in the external pressure tubular design the membrane is cast on the outer surface of an essentially incompressible tubular, porous, ceramic cores. The permeate passes through the external membrane, on through the porous substrate, and into the internal permeate duct.

One, seven or nineteen of these cores are installed in a 1, 2, 2½ or 4 inch pressure vessel, and the permeate is ducted out of one end of the vessel. In most cases, a plastic covered wire or spring is wound around the tubular core to increase the tubulence. Since the core is pressurized uniformly and does not yield to this external pressure, the membrane is not subjected to stresses, as in the case of internal pressure tubular designs. Operating pressures to 1,500 psi (100 kg/cm$^2$) have been achieved in these systems.

In external pressure tubular designs, a hydraulic imbalance is created by the fact that one end of the core is subjected to system pressure but the other end communicates with the atmosphere. (The core is connected to the system at only one end rather than two, as in internal pressure and spiral module designs.) This imbalance has the beneficial effect of holding the string of cores in tight contact one with the other, while at operating pressure, thereby improving seal efficiency and minimizing internal leakage. However, this force does subject the core to a longitudinal compressional force. The thickness of the ceramic walls must be sufficient to withstand radial and axial compressional forces without breaking. When cores are fabricated with less rigid porous substrates, such as sintered polyethylene, this longitudinal compressional force causes axial compression and radial enlargement of the cores, creating objectional tensional forces in the membrane skin and, in some cases, even causing the membrane to separate from the surface of the tube. It would be highly desirable to be able to employ these less rigid substrates, since the ceramic cores are fragile and require considerable care to prevent damage during handling and shipping. In some cases, the ceramic cores break in service, permitting large volumes of concentrate to contaminate the permeate.

External pressure tubular RO devices can accept high inlet pressures and have a much lower sensitivity to hardness minerals than hollow fiber or spiral module devices, permitting single pass desalination of sea water. However, the possibility of broken cores or separated seals greatly limits the use of external pressure tubular devices in potable water supplies and makes them unsuitable for use in sewage systems.

The external pressure design permits operation at very high turbulence and high linear flow rates. While the above mentioned longitudinal compressional force tends to maintain a proper seal between individual cores in a series string, this beneficial force is occasionally overcome by the high viscous drag experienced when operating at high linear flow rates. As presently manufactured, these viscous forces oppose the longitudinal compressional forces in one half of the pressure vessels. Recently, in several cases, these viscous forces have caused the connectors between cores in a series string to open, permitting concentrate to enter the permeate duct.

Also, during system start up, prior to establishing system pressure, the hydraulic imbalance is not yet established and viscous forces may occasionally separate cores, causing serious internal leakage.

With respect to the problem of treating radioactive wastes, the ceramic cores cannot be ashed, and, therefore, result in a very high volume of solid waste, increasing the nuclear waste disposal problem. Further, conventional turbulators are made of plastic coated wire. The residual wire further complicates disposal problems.

Practical considerations limit external pressure tubular devices to two commercial configurations, 7-core and 19-core. As a matter of fact, 19-core bundles present such severe assembly, installation and maintenance problems that their applications are very limited. However, assuming that, with care, they could be used, they cannot accept feed rates in excess of 250 tons per day. Systems with larger flow rates require complex and costly high pressure manifolding to permit series-parallel operations, so that each cell may operate within established hydraulic limits.

SUMMARY OF THE INVENTION

I have invented a totally new RO design in which I have preserved the beneficial effects of internal and external pressure RO devices, while, at the same time, overcoming most of the deficiencies associated therewith. This new device is defined and described as the "balanced pressure tubular" design. It employs a tube or core composed of a porous substrate, containing internal, tubular, membrane coated surfaces. The external tubular surface may also be coated with membrane, though the external surface is more subject to damage; further, the external surface only makes a significant contribution to the total membrane area in the smaller core sizes.

In order to understand the various phenomena with respect to my device, it is necessary to realize that it contains two separate, though related, force or pressure systems. One is a mechanical system consisting of a heterogeneous, porous solid. The other is a hydraulic system consisting of wter or an aqueous mixture of solutes in water. Under dynamic, operating conditions, aqueous media surround the tubular core and fill the internal tubular passages, plus the cavities within the heterogenous, porous solid.

In my device, the hydraulic pressures within adjacent internal tubes, and the hydraulic pressure on the outer surface, oppose one another, so that the internal tubes are not subjected to hoop stress. These fluid forces impose a static, mechanical, compressional load on the granules within the porous substrate. Being tightly packed in the space between tubular surfaces, the granules carry this compressional load by point-to-point contact between pressurized surfaces. Compressional loads are thus balanced against one another, excepting for the zone within the central circle of tubular surfaces, as shall be explained later in this specification.

Some of the deficiencies of internal pressure RO so rectified are as follows:
1. Tensile stress on membrane due to hoop stress on supporting tubing.
2. Stress concentration at header ends of tube bundles.
3. Catastrophic system failure due to rupture of pressure tubing.
4. Relatively low operating pressures due to limited burst strength of tubes.
5. Costly internal tensioning rod, which also causes stress concentrations.
6. Relatively low "packing density" (square meters of membrane per cubic meter of cell bank.)
7. Replacement or factory overhaul of entire module due to failure of one tube (required in most designs.)
8. Inability to effect single pass desalination of sea water.
9. High residue on combustion of spent tubes used in nuclear applications.
10. Costly high pressure series-parallel manifolding for high volume systems.

Some of the deficiencies of external pressure RO devices corrected by my design are as follows:
1. Brittle small diameter ceramic cores often break during shipping, handling, installation and, occasionally, in service.

2. Large number of seals increases the chance of seal failue. [There are 133 separate core seals in a standard 7-core, 18.5 foot (5.64 meter) pressure vessel.]
3. Standard design with 7 or 19 cores in parallel and six strings in series makes assembly nd installation difficult, requires 4 men to insert or remove a bundle of cores.
4. Large longitudinal and radial compression forces increase required thickness of core substrate, increasing weight, with resultant increase in material and transportation costs.
5. Hand wound turbulator wires or springs used on cores increase assembly costs.
6. "Dead space" between cores reduces hydraulic efficiency.
7. "Dead space" also increases the hold up volume, limiting the "degree of concentration" or "concentration ratio" in many applications
   (Concentration Ratio = Volume of feed/Volume of Final Concentrate)
8. Relatively low "packing density" of membrane.
9. Large clear working space required opposite "service end" of machine. Clear space must be approximately as large as the length (and width) of the cell module, resulting in inefficiencies in facility lay-out and utilization of plant space.
10. Ceramic cores with uniformly circular cross sections are an absolute necessity or the core will not pass through the ring die. In cases of moderate "elipticity" of the core, a non-uniform layer of membrane results.
11. Many small parts, connectors, turbulators and seals are required on cores, increasing complexity and chance of failure.
12. Seal failure due to high viscous drag separates "slip joint" connectors, resulting in system failure while in service.
13. High volume of inorganic residue creates disposal problem in nuclear applications.
14. Leakage occasionally occurs around the complex permeate collector due to imperfections in the seals or to defects or cracks in the permeate collector.
15. Costly investment castings required on ends of pressure vessels.
16. Costly high pressure series-parallel manifolding required for high volume systems.

The objective of my invention is to improve upon the deficiencies listed above, but the scope of my invention is not necessarily limited to the improvement of these deficiencies, and those skilled in the art will understand from the description in the specification the object and the working effect of my invention.

BRIEF DESCRIPTION OF THE DRAWINGS

FIG. 1. Balanced pressure core with one feed tube and one permeate duct, transverse cross sectional view.
FIG. 2. Isometric view of the device of FIG. 1.
FIG. 3. Opposite end of the device of FIG. 2.
FIG. 7. Conventional 2½" external pressure 7-core, Reverse Osmosis Device.
FIG. 8. 7-core, 2½" device using balanced pressure cores illustrated in FIGS. 1 and 2, transverse cross sectional view.
FIG. 9. Permeate duct with extra reinforcement.
FIG. 10. Permeate duct with extra reinforcement.
FIG. 10A. Permeate duct with extra reinforcement.
FIG. 19. Longitudinal cross section of the device of FIG. 15, showing means of interconnecting cores.
FIG. 21. The device of FIG. 15 with perforated metal liner and pipe threads for interconnecting cores.
FIG. 32. Device with auxiliary radial permeate ducts and optional axial permeate ducts.

DESCRIPTION OF THE PREFERRED EMBODIMENTS

Figure 4:
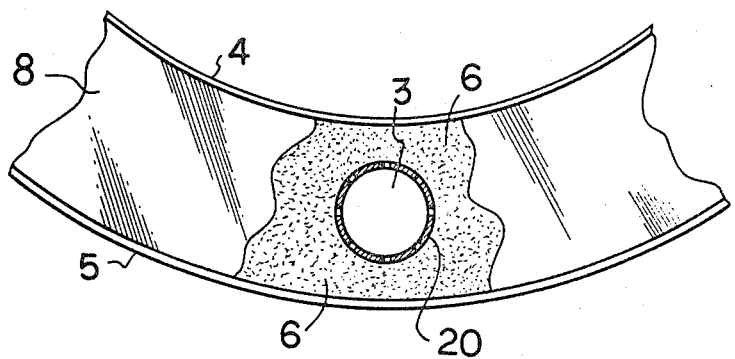
FIG. 4. Permeate duct with perforated metal liner.

My invention is described by a series of drawings. FIG. 1 shows a cross section and FIG. 2 an isometric rendering of the simplest embodiment of my invention. Core 1 is a porous tube with two tubular internal passages. Item 2 is a relatively large tube for internal passage of feed solution, here shown as a cylindrical surface, though there is no intrinsic limitation dictating that it be such. Similarly, item 3 is a relatively small tube for internal passage of permeate, also shown as cylindrical, but not herein limited to said contour. The outer surface of core 1 is also shown as cylindrical, but again is not intrinsically limited thereto. Item 4 is a membrane on the inner surface, 2, where it is either cast in place or inserted after fabrication. Item 5 is an optional membrane, cast on or attached to the outer surface of core 1.

Passage 3 is the permeate duct for this RO core. In service, it communicates with the outside of the machine and is maintained at, or close to, atmospheric pressure. The tube itself is installed in a pressure vessel, item 7, and the membrane coated inner surface and the outer surface of the core 1 are exposed to balanced system pressure. The membrane surfaces resist the intrusion of ions and molecules of dissolved solids (solutes), but permit water molecules to pass with relative ease. Once the water molecules have passed through the membrane skin, they proceed into the relatively low density substrate, item 6. This substrate may be composed of ceramic materials, sintered glass, sintered metal, sintered or foamed plastics such as polyethylene, polyvinylidene fluoride, polyvinyl chloride, acetal, polystyrene or polyurethane, granulated or foamed rubber, fused, consolidated, resin treated or otherwise fixed sand, silica, feldspar, clay, diatomaceous earth or other inorganic mineral or fossil substance, treated wood, wood fiber or wood powder, consolidated coal, asphaltite, gilsonite or other bitumen powder, or any one of a number of other porous solid substances. (The use of plastic, coal, asphaltite, gilsonite or other bitumen, rubber, wood based or other organic substrates is particularly beneficial for use in treating radioactive wastes, since they may be converted to an ash or chemically decomposed to minimize the volume of radioactive waste.)

The water molecules can pass through the porous substrate to tube 3, which is the permeate duct. The highest flux through membranes seldom exceed 0.014 ml/cm$^2$/minute. Consequently, the internal flow rates are very low. Many available porous substrates can accept these flows without creating objectionable internal parisitic pressure drops. (This matter is further analyzed in a subsequent section.)

Item 8 shows the end of the core, which may be sealed by fusing, glazing, encapsulating or other technique. In the absence of membrane 5, the outer surface of core 1 would also be sealed against fluid intrusion, or it may be surrounded with a thin plastic or metal shell, as shown in a subsequent drawing.

Item 8 is a connector for connecting the core to the outside of the machine, or for coupling the core to another core of the same type in a series string. FIG. 3 shows the opposite end of the same core, on which there is installed a similar, but mating connector, item 10. If this core was to be used alone, or was to be the last in a string of cores in series, a blind plug, such as item 12, and seal 13 would be inserted in connector 10. A turbulator, item 11, surrounds core 1 as an optional accessory.

This design has the considerable advantage that membrane coated surfaces, 4 and 5, and supporting structures, 6, are exposed to balanced pressures. The membrane coated internal tubular surface, 2, is not exposed to hoop stress, as in the conventional internal pressure design. The outer surface is not exposed to high compressional forces. The granules of heterogenous substrate below the membranes carry these forces. There are radial compressional forces in the area of the permeate duct, but the large amount of solid substrate in that zone provides adequate support against them. The bulk of the end faces, 8, are exposed to balanced axial compressional forces. A small area near the permeate duct, 3, physically carries the hydraulic load imposed by the fact that one end, 12, is exposed to system pressure while the other communicates with the atmosphere.

The determination of the pressure drop within the substrate will be given later, by use of Darcy's equation. The significance of this internal pressure drop is limited to the more dense substrates, very large tubes, ultrafiltration with its high fluxes at relatively low feed pressures and combinations of these effects.

FIG. 4 shows a further embodiment of my invention, in which a perforated stainless steel liner, item 20, is inserted into the permeate duct, 3. This extra reinforcement is particularly suitable where high operating pressures or thin wall sections are to be employed. It is also an important component of the configuration of my device recommended for producing potable water and for treating sewage wastes. This internal liner 20 may be extended beyond the ends of the porous tube, 1, facilitating the inter-connection of a series string of cores, and the delivery of the permeate. For potable water, food product and sewage applications, suitable tubing connectors, pipe couplers or sanitary fittings may be employed to provide highly reliable inter-core connections, as further described below.

Figure 5:
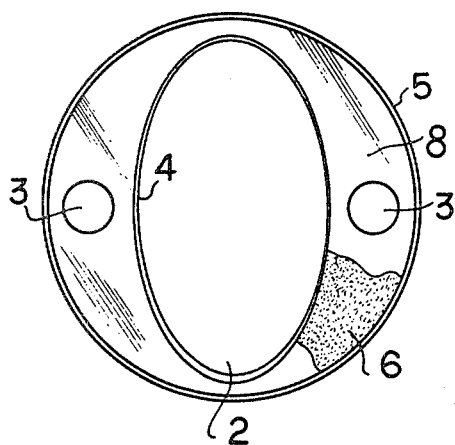
FIG. 5. Cylindrical balanced pressure core with two permeate ducts and one eliptical feed tube.
Figure 6:
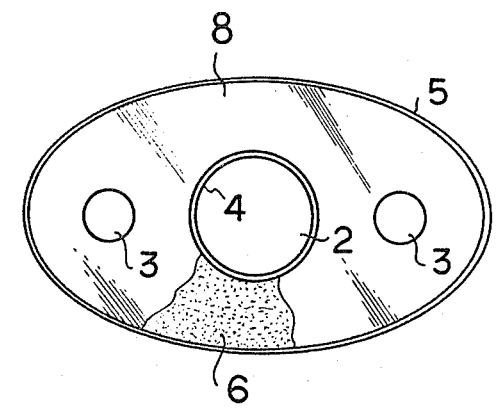
FIG. 6. Eliptical balanced pressure core with two permeate ducts, one cylindrical feed tube.

FIGS. 5 and 6 show cross sections of similar tubes in which two permeate ducts are employed and in which either the outer or inner profile is an elipse or other contour which permits the use of two permeate ducts, and maximizes the amount of membrane surface.

FIG. 7 represents a standard 7-core external pressure tubular RO design and FIG. 8 shows how a similar pressure vessel could accommodate seven balanced pressure cores, designed in accordance with the principles described above. In this modification, FIG. 8, the packing density of membrane has been substantially increased by providing membrane on both inner, 2, and outer surfaces of the porous cores. This design yields substantially increased permeate when compared to the conventional design, FIG. 7.

FIGS. 9, 10 and 10A show ways in which the strength of the boss and the diameter of the permeate duct may be increased. However, for casting efficiency it has been found to be preferable to maintain a circular cross section for the membrane coated inner surface or surfaces of a core.

Figure 11:
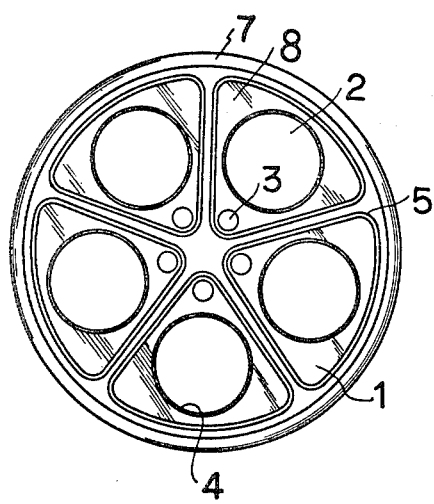
FIG. 11. Device of FIG. 1, contoured to nest closely in 5-core device.
Figure 12:
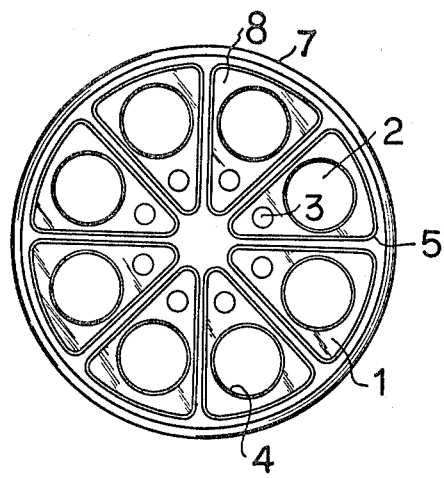
FIG. 12. Device of FIG. 1, contoured to nest closely in 8-core device.

FIGS. 11 and 12 show designs intended to be used in the same pressure vessels as those used for a standard external pressure, 7-core RO system. Morphologically, these cores are the same as shown in FIGS. 1 and 2. However, the outer surfaces have been contoured so that the individual cores nest together, eliminating the "dead space" shown in the standard external pressure design, FIG. 7, item 21. In these designs, FIGS. 11 and 12, turbulators (FIG. 2, item 11), must be installed on at least half of the cores to keep the adjacent surfaces separated and to permit fluid flow. The design shown in FIG. 12 provides 2.5 times as much membrane surface as the standard 2½ inch, 7-core, external pressure tubular design, FIG. 7, for a 150% increase in membrane area. This increased membrane area provides a comparable increase in the amount of permeate produced by a given section of pressure vessel, thereby substantially reducing the number of costly pressure vessels, manifolds, etc. in a cell bank. Progressing from the 5-core design, FIG. 11, to the 8-core design, FIG. 12, the strength of the permeate duct may be progressively increased.

Figure 13:
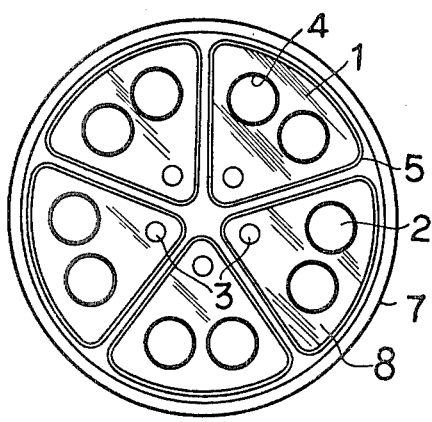
FIG. 13. 5-core device with two feed tubes, cores contoured to nest closely.
Figure 14:
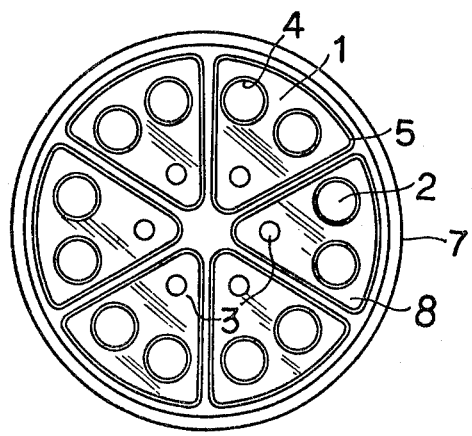
FIG. 14. Same as the device of FIG. 13, but 6-core design.

FIGS. 13 and 14 expand further upon the concept introduced in FIGS. 11 and 12. In these designs, two internal tubular surfaces, 2, are coated with membrane and a third, 3, is employed as a permeate duct. In FIG. 14, the membrane surface is 2.6 times that of the standard external pressure, 2½ inch design, FIG. 7, for a 160% increase of membrane area.

For ease of installation, maintenance and service, it is beneficial to reduce the number of permeate connections. Therefore, in FIGS. 15 and 16 I show one of the preferred embodiments of this invention. The central tube, 32, is the permeate duct, and all other internal tubular surfaces, 31, are coated with membrane, 4. The external surface may also be coated with the optional membrane 5. This design offers numerous advantages over my other balanced pressure tubular designs. Except for the internal tubular passages, item numbers on the figures have the same meanings as on previous figures. The principle difference is in the use of many cylindrical, membrane-coated, internal tubular surfaces, 31; one cylindrical external surface with optional membrane, 5; and one central, uncoated permeate duct, 32, equipped with connectors.

In this design, the permeate duct, 32, is not necessarily smaller or larger than the internal feed flow ducts, 31.

Figure 15:
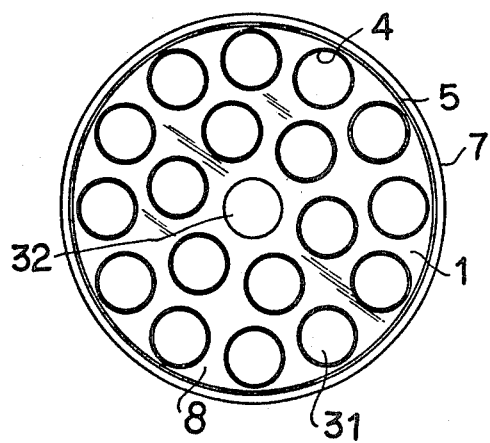
FIG. 15. 2½" balanced pressure device with one permeate duct and 18 feed tubes.
Figure 16:
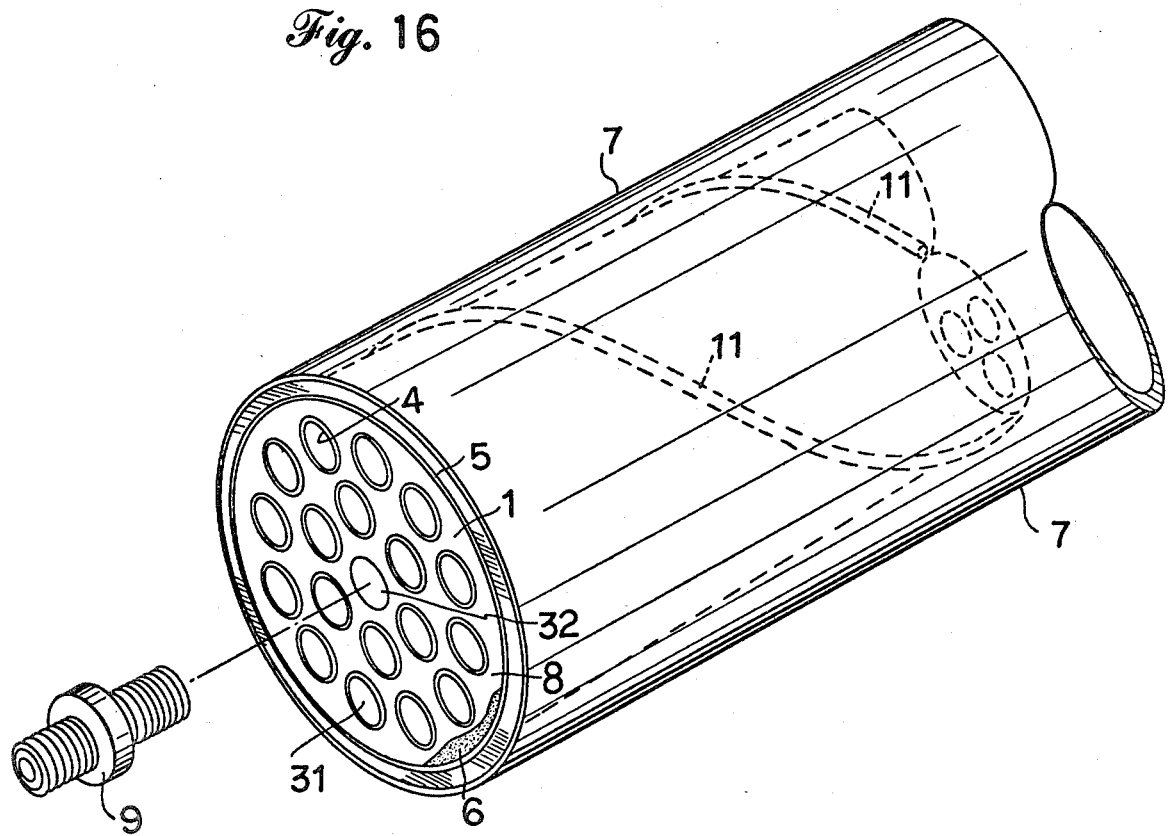
FIG. 16. Isometric view of the device of FIG. 15.

FIGS. 15 and 16 illustrate two of the optional ways in which this concept could be used in pipe sizes from 2 inches to 3 inches.

Figure 17:
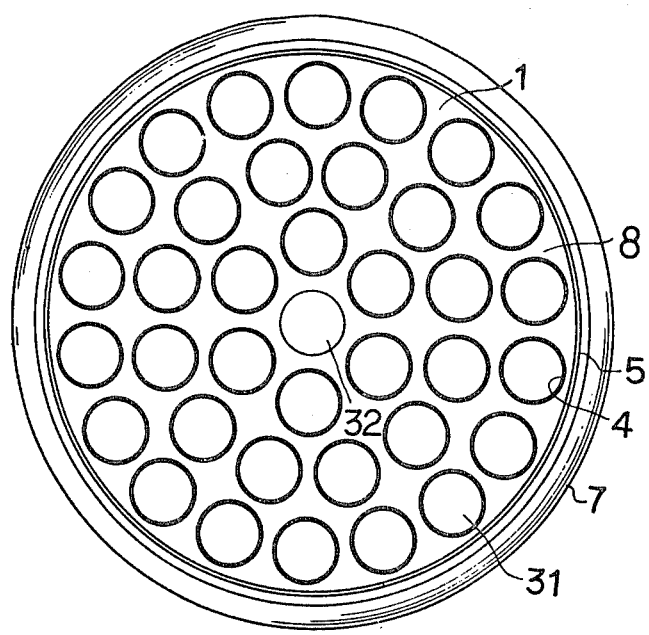
FIG. 17. 3½" design with one permeate duct and 36 feed tubes.
Figure 18:
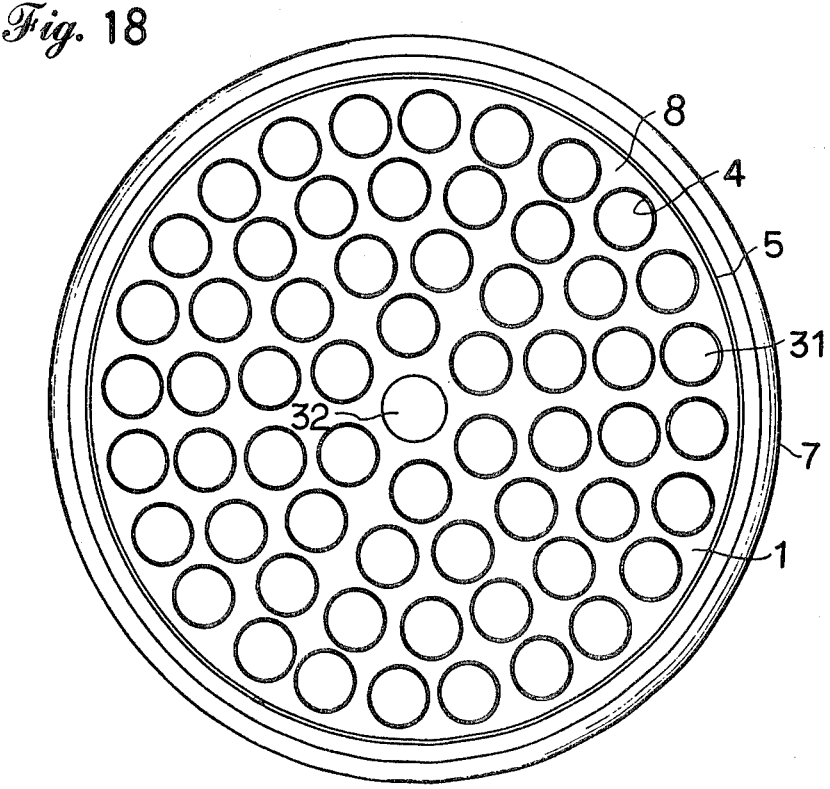
FIG. 18. 4" design with one permeate duct and 60 feed tubes.

FIGS. 17 and 18 illustrate two possible designs suitable for 3½ inch and 4 inch pipe sizes. They are given as illustrations only, and do not indicate any limitation upon the upper limits of pressure vessel sizes, or upon the diameters of the feed or permeate ducts or the number of rows of internal tubular passages.

FIG. 19 is a cross section of two cores designed in accordance with FIG. 15, showing a means for interconnecting individual cores.

Figure 20:
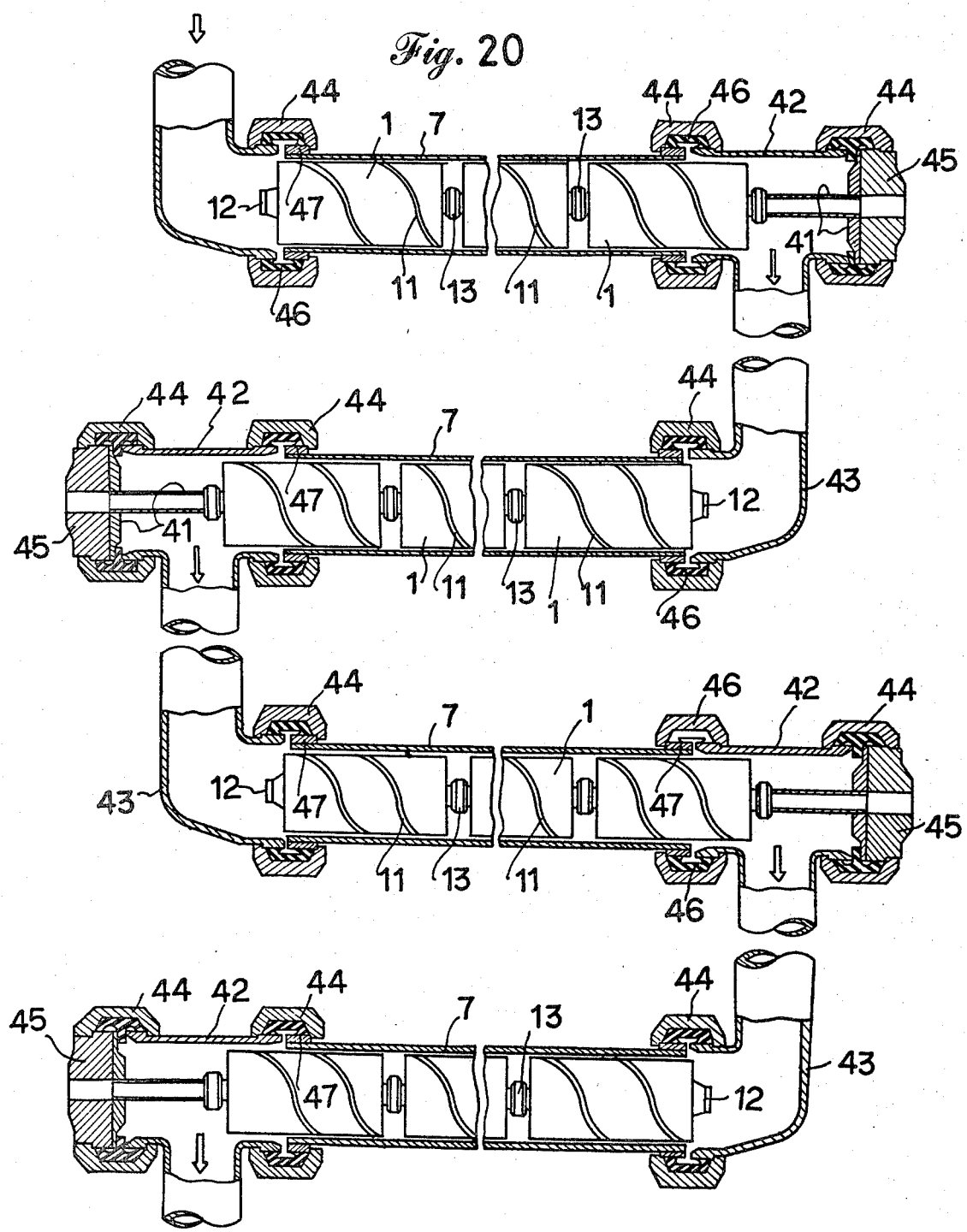
FIG. 20. Assembly consisting of four pressure vessels containing the device of FIGS. 15 and 16.

FIG. 20 shows an assembly of pressure vessels containing cores similar to those illustrated in FIGS. 15 through 19. The internal passages are not shown. In addition to the other standard designations, 41 is the permeate collector, 42 is the permeate portion of the header casting, 43 is the feed return portion of the header casting, 44 is a pipe coupler, 45 is a retainer flange placed at the permeate end of the pressure vessel, 46 is a gasket for pipe coupler 44, and 47 is a collar for pipe coupler 44. While I have found this configuration to be an improvement over designs in which one end of the machine has only type 42 headers and the other end only type 43 headers, my core design can be employed in either way, provided that a non-slip connector design is employed, e.g. bayonette or threaded connector, pipe or tubing fitting.

This embodiment of my invention overcomes many of the disadvantages of other tubular designs and introduces new advantages not anticipated during the development effort.

With respect to internal pressure tubular designs, my invention treats the aforementioned deficiencies as follows:

1. There is no problem of membrane being put under tension due to hoop stress, since the internal and optional external membrane coated surfaces of the core are in static mechanical balance.
2. There are no headers with fluid pressure at opposite ends of the tubes, resulting in stress concentration at the ends of the tubular surfaces.
3. Since the tubular surfaces are not subjected to unbalanced hoop stresses, tube rupture does not occur.
4. Due to the lack of unbalanced hoop stresses, working pressure limits can be increased from the usual 800 psi (53.3 kg/cm$^2$) to over 2,000 psi (133 kg/cm$^2$), should the application so require.
5. Costly tensioning rods are eliminated. '6. Packing densities of considerably higher magnitude can be achieved.
7. Catastrophic failures of tubing are eliminated. In the case of minor membrane defects, membranes supported on a semi-porous substrate undergo a "self-healing" phenomenon when minor membrane defects occur. Suspended solids in feed solutions usually plug the passages in the substrate, eliminating such leakage paths. When required, this process can be accellerated by introducing a latex or a vegetable gum into the feed. If a defect does not yield to this treatment quickly enough, a single segment of a series string of cores may be replaced in the field. Since the pressure carrying vessel, item 5, is a piece of conventional pipe, it is unaffected by such a defect. Only the core requires repair or replacement.

In a like manner, my invention treats the aforementioned deficiencies of external pressure tubular designs as follows:

1. The cores shown in FIGS. 15 through 19, even if fabricated with ceramics, have a much larger overall cross section (diameter to length ratio) than conventional external pressurized cores, increasing strength and minimizing the problems of breakage. Further, a much broader range of engineering materials may be employed in their construction. For example, sintered plastics, such as sintered polyethylene, are not fragile and can be employed in my invention.
2. Instead of seven pairs of couplers per joint (0.91 meters), as in the 2½ inch 7-core external pressure design, in my invention there is only one pair. In addition, 2 meter cores may be made, whereas conventional external pressure designs are limited to 0.91 meters, due to the brittle nature of the small diameter ceramic cores. This factor permits a further 55% reduction in the number of joints.
3. Cores may be individually connected as they are inserted by a lone operator, thereby eliminating the need for a four man team.
4. Lower density porous substrates can be employed, reducing weight.
5. Only one turbulator is required per joint, instead of the conventional 7 or 19, as in the 2½ inch or 4 inch external pressure tubular designs. In the absence of the optional external membrane, it can be totally eliminated.
6. The diameter of the internal passages and the annular clearance between the core and the pressure vessel can be controlled and designed to provide optimum hydraulic efficiency and flow distribution (internal and external), thereby eliminating the problem of dead spaces between cores and the poor flow distribution of conventional designs. When the external membrane, 5, is omitted, a close fitting core will minimize external flow. Or, a single "O" ring or similar seal or gasket may be employed to prevent external flow without sacrificing the balanced pressure concept.

7. The elimination of "dead spaces" also reduces hold up volume, thereby permitting a higher Concentration Ratio.

8. Higher packing densities are achieved, providing 147% more membrane than achieved with conventional 2½ inch 7-core external pressure tubular designs.

9. Since individual joints can be connected at the machine as they are inserted, the clear working space can be limited to the length of one core segment; for example, one meter will suffice for 1 meter cores, instead of the usual 6 meters required for 7-core external pressure tubular designs.

10. Sintered or otherwise consolidated cores are more nearly true to the circular cross section of their mandrel than are ceramics. (Considerable effort must be expended in order to prevent "slumping" or flattening of ceramics during firing.) Circular cross sections are essential for external pressure tubular membrane casting efficiency.

11. Only one set of connectors is required per joint, instead of the usual 7 or 19. Further, the connectors can be molded directly into plastic substrates, as shown in FIG. 19, improving the seal efficiency and limiting the required elastomeric seals to one per joint, instead of the usual three. In the case of 19 core designs, this savings permits the elimination of 38 elastomeric seals per joint. Then, as mentioned in item 2, above, the joints may be made 2 meters in length instead of 0.91 meters, for the equivalent savings of 84 seals per segment.

12. Due to the smaller servicing space required, the cell module may be serviced from both ends. In conventional external pressure designs, one set of castings is required for the service end and a different set is employed on the other. With my invention, the same casting may be employed on both ends.

13. Seal failures due to viscous drag are eliminated by use of the castings described in item 12, above, and shown in FIG. 20. Cores may be installed in such a way that the forces of viscous drag are always in the same direction as the longitudinal compressional forces, rather than opposing them in half of the cells, thereby improving connector reliability.

In addition to the above, my invention makes possible the following advantages not anticipated by prior experience:

1. Concept lends itself to a much broader range of pressure vessel sizes rather than being limited to 2 inch, 2½ inch and 4 inch pipe sizes. This phenomenon further reduces pressure vessel costs and reduces operating costs (pumping costs).

2. The end faces of individual joints of cores need not be equipped with seals, since they may be fused, encapsulated or otherwise rendered impervious without the use of additional elastomeric seals. This innovation is particularly beneficial for preventing impingement from the suspended solids present in some feed solutions.

3. Cores as shown in FIGS. 15, 16, and 19 may be used to retrofit external pressure tubular 7-core systems, thereby achieving increased performance at the same operating pressure or the same product water flow at much lower pressures, and substantially reducing operating costs. Similarly, the 4 inch design shown in FIG. 18 can be used to retrofit external pressure 19-core systems.

4. A further unexpected operational advantage has been realized due to the space provided between cores in series. In internal and external pressure tubular designs, high concentrations of solutes and stagnant boundary layers develop in the immediate vicinity of the membrane surface, and spread down stream as the feed solution progresses through or around the tubes. However, in my design the fluid passes into the 1 to 15 cm. space between joints, where the feed from the internal tubular passages and the optional external annular passage are thoroughly mixed under turbulent conditions, prior to entering the next segment of balanced pressure tubular RO core.

5. Because of the balanced pressure design, large wall sections between the outer tubular surface and internal tubes are not required, nor are large separations required between adjacent internal tubular surfaces. These characteristics facilitate maximizing of packing densities. If the walls are sufficiently strong to prevent rupture during manufacturing, shipping and installation, and if they permit passage of the permeate, they will not fail in normal service. The coefficient of fluid resistance of many available porous substrates is much higher than that of membranes, resulting in relatively low internal flow rates. Further, the geometric considerations relating to tubing layouts provide adequate cross sections for the transmission of permeate from the membrane surfaces to the permeate duct, so that parasitic losses can be controlled. This matter is discussed extensively, below.

6. When core materials are selected from one of the classes of porous organic substrates (e.g. plastic, bitumen, etc.), and when the turbulators, connectors and seals are also composed of organic substances, the resultant device is particularly suitable for use in nuclear applications. It may be decomposed by thermal or chemical means, yielding the smallest possible volume of solid waste.

7. Due to the broad latitude in the diameter of pressure vessels and cores, complex, high pressure, series—parallel manifolding is not required, as further delineated below.

FIG. 21 shows another configuration based upon the design shown in FIG. 4, in which a perforated liner, 20, is employed in the porous core. In this case, the perforated liner extends beyond the end of core (perforations only within the core) and terminates in a pipe coupler, 50, facilitating interconnecting of cores. The threaded end may then couple directly into the retainer flange, 45, without the need for an unreliable permeate collector, item 41, FIG. 20. The terminal core is then plugged with a conventional pipe cap, 51.

Figure 22:
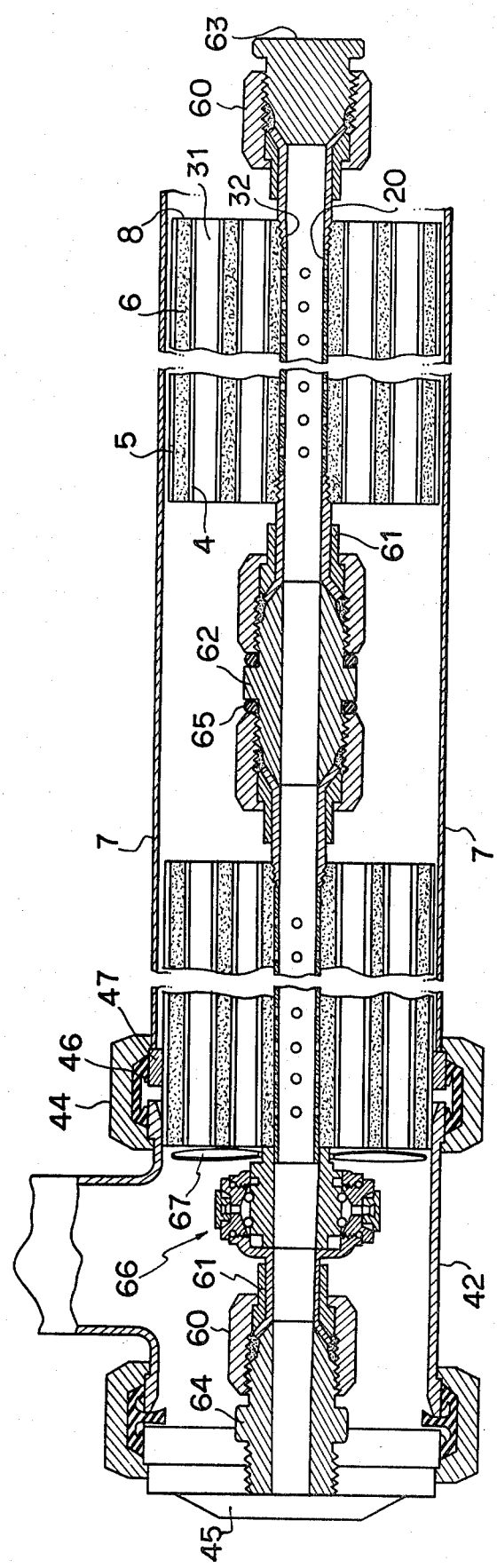
FIG. 22. The device of FIG. 15 with a perforated metal liner, tubing fittings for interconnecting cores, a swivel joint to permit rotation and an impeller to augment the rotational torque.

FIG. 22 shows another configuration similar to FIG. 21, but employing conventional tubing fittings. In this case, AN or MS fittings are shown, but other commercial types of tubing fittings such as "Swagelok" or "Eastman" could be used with no change in the basic concept. In addition to items previously identified, 60 is a "B" nut, AN-818 or MS-20818; 61 is a sleeve, AN-819 or MS-20819; 62 is a tubing union, AN-815 or MS-24392; 63 is a tubing plug, AN-806 or MS-24404 serving as a blind plug, similar to FIG. 3, item 10; item 64 is a pipe to tubing union, AN-816, or MS-20816, coupled directly into the retainer flange, 45, without a permeate collector, item 41, FIG. 20, a known source of incipient leakage; item 65 is an "O" ring (this "O" ring has been found particularly suitable for preventing leakage from the pressure chamber into the permeate duct, even though it is known that this "O" ring design is of limited utility in preventing leakage in hydraulic applications, for which it was originally designed); 66 is an optional swivel joint; and 67 is an optional impeller.

This design has been found to be one of the most adaptable, since it greatly simplifies installation of membranes, minimizes leakage, and yields the highest reliability in potable water and sewer applications. The high pressure capability, combined with high reliability, permit this design to be used in single pass desalination of sea water. The optional swivel joint permits the string of cores to rotate slightly, especially on start up, driven by the torque created by the turbulator 11. This innovation minimizes the propensity for fouling and suspended solid (SS) buildup on the under side of the optional external membrane. For larger sizes of cores, the relatively smaller volume of feed solution passing through the annulus is not sufficient to cause rotation of the string of cores on start up, necessitating the use of the optional impeller, item 67.

Figure 23:
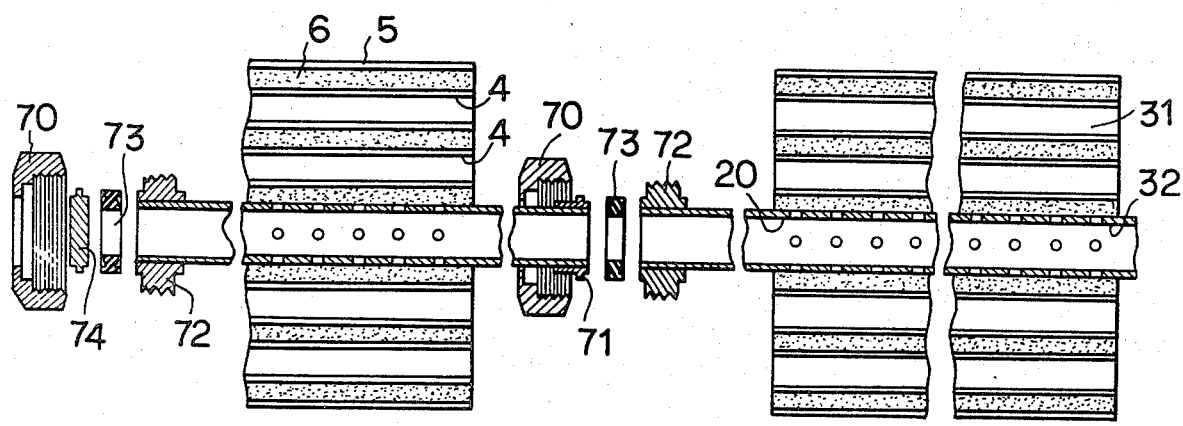
FIG. 23. The device of FIG. 15 with a perforated metal liner and sanitary fittings.

FIG. 23 shows a design similar to FIG. 22, except that qualified and approved sanitary fittings have been employed in order to comply with the "clean in place" requirements of the food industry, 70 is the retainer nut; 71 is the flange; 72 is the threaded coupling; 73 is the sanitary gasket; and 74 is a sanitary "blank" or end plug.

With the designs shown in FIGS. 21, 22 and 23, a rotation of the cores may be effected intermittently without the use of the swivel joint. During regular maintenance periods, the pipe couplings, 44, may be loosened and the retainer flange, 45, manually rotated 60° to 90°, thereby rotating the entire string of cores.

The designs shown in FIGS. 21, and 22 also permit retrofit and upgrading of conventional external pressure tubular designs. The backside of the existing retainer flange, 45, can be tapped to accept the appropriate coupler. In the case of FIG. 23, a piece of sanitary tubing is welded through the retainer flange. The unreliable permeate collector, 41, is thereby eliminated.

With the designs shown in FIGS. 21, 22 and 23, the problem of seals and slip fittings being pulled apart due to viscous drag is totally eliminated. Accordingly, no special attention need be given to maintaining flow toward the permeate end of the pressure vessel. In the case in which a swivel joint is employed to cause core rotation, it is preferable to have flow away from the permeate end of the pressure vessel, the reverse of what is shown in FIG. 20.

External pressure tubular RO designs employ specially molded or machined plastic couplers and elastomeric seals, resulting in unreliable connectors with frequent failures due to leakage. These special use, single source components also increase costs and create difficult logistic problems. However, in the configurations illustrated in FIGS. 21, 22 and 23, I employ highly reliable, time tested, commercially available components. Most of these connectors may be procured in the field from multiple sources, thereby further reducing costs and logistics problems. Further, these connectors totally eliminate the problem of separation of joints due to viscous drag.

Figure 24:
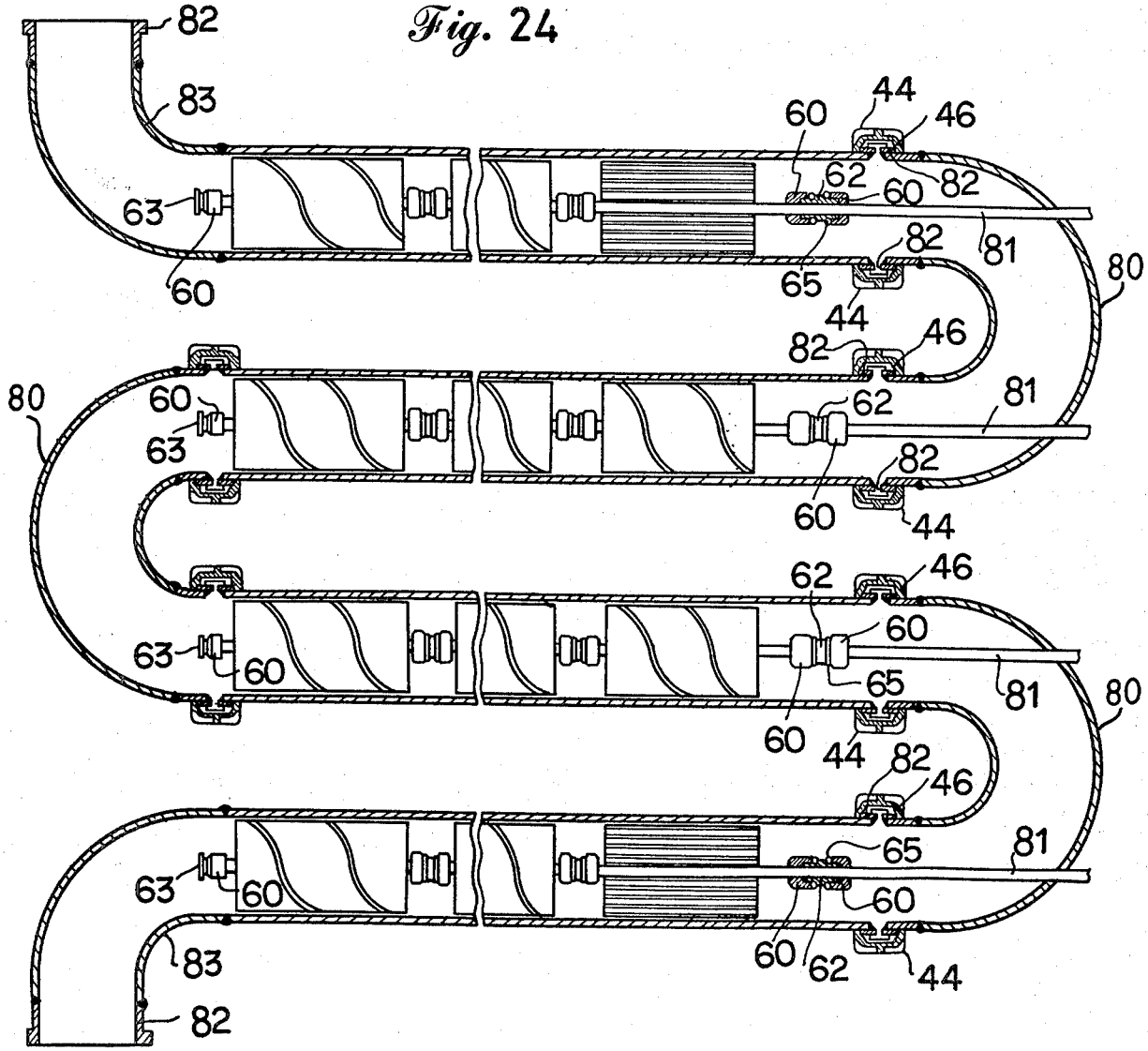
FIG. 24. An assembly of four pressure vessels containing the device of FIG. 15 with perforated metal liners and tubing fittings, said pressure vessels using conventional 180° tubing returns instead of the castings of the device of FIG. 20.
Figure 25:
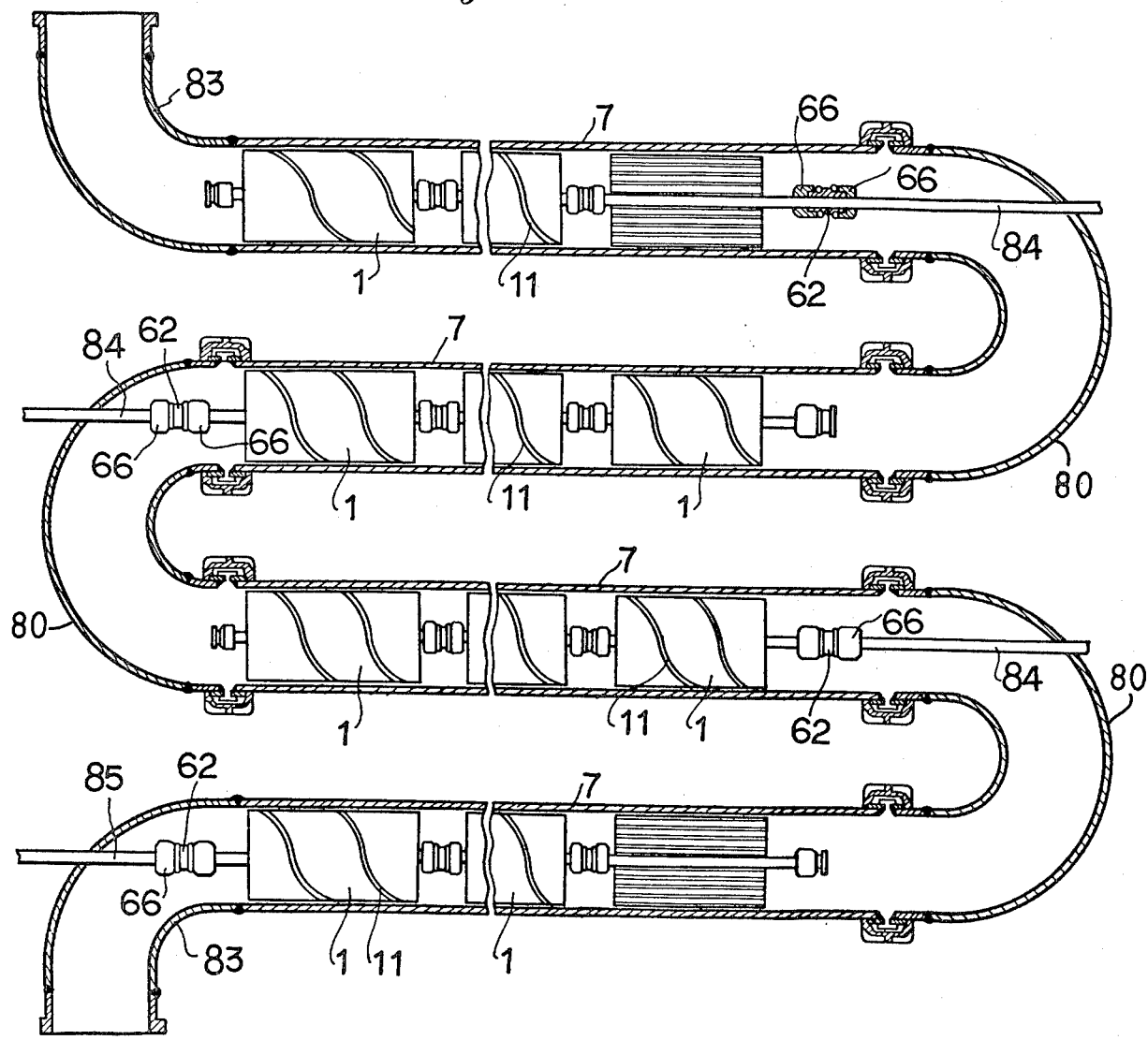
FIG. 25. The device of FIG. 24 with flow either toward or away from the permeate delivery end.

FIGS. 24 and 25 show further embodiments in my invention in which I have totally eliminated the use of the investment cast permeate header, 42, return header, 43, and retainer flange, 45. The tooling for, and production of, these components have constituted major elements in the cost of fabrication conventional external pressure tubular RO systems. I have found that I can replace them with conventional, commercially available 180° tubing returns, 80. To these standard tubing returns, I add one or two permeate delivery tubes, 81, centrally positioned so that the tube or tubes will emerge from the tubing return on the axis or axes of the mating pressure vessels. Two collars, 82, are also added to permit connection by use of a pipe coupler, item 44. Feed solution may then enter the cell bank and concentrate may leave directly, or through conventional tubing elbows, 83, also fit with collars for pipe couplers, 44.

FIGS. 24 and 25 are essentially the same except that, in FIG. 24, all permeate connections are on the same end of the machine, and in FIG. 25 they alternate in order to permit all flow to be either toward or away from the permeate end of the cell, according to the special needs described above. Accordingly, in FIG. 25 it is necessary to have one permeate tube, 84, in one of the tubing elbows, 85. Flow may either be toward or away from the permeate end, depending upon whether this elbow, 85, is the feed inlet or concentrate outlet. If the elbow 85 is to be the concentrate outlet, flow would be toward the permeate end of the cells. If the elbow 85 is to be the feed inlet, flow would be away from the permeate end of the cells.

With hollow fiber, spiral module and internal and external pressure tubular RO, economical considerations have dictated that pressure vessels and modules be limited to a maximum of two or three sizes. These limitations result from numerous factors, such as the use of highly specialized castings, various manufacturing tools and fixtures, geometric considerations, etc. However, with the elimination of these constraints, new opportunities for improved designs were created.

In order to accommodate large flows with the limited number of available module sizes, it has been common to make use of series-parallel arrays of pressure vessels and modules. However, the piping for such series-parallel systems requires complex and costly high pressure manifolding. These manifolds become particularly complicated when high concentration ratios are to be achieved. For a concentration ratio of 10:1, they may start out with 12 to 20 pressure vessels in series-parallel and stage progressively down to a number of vessels in series only.

Figure 26:
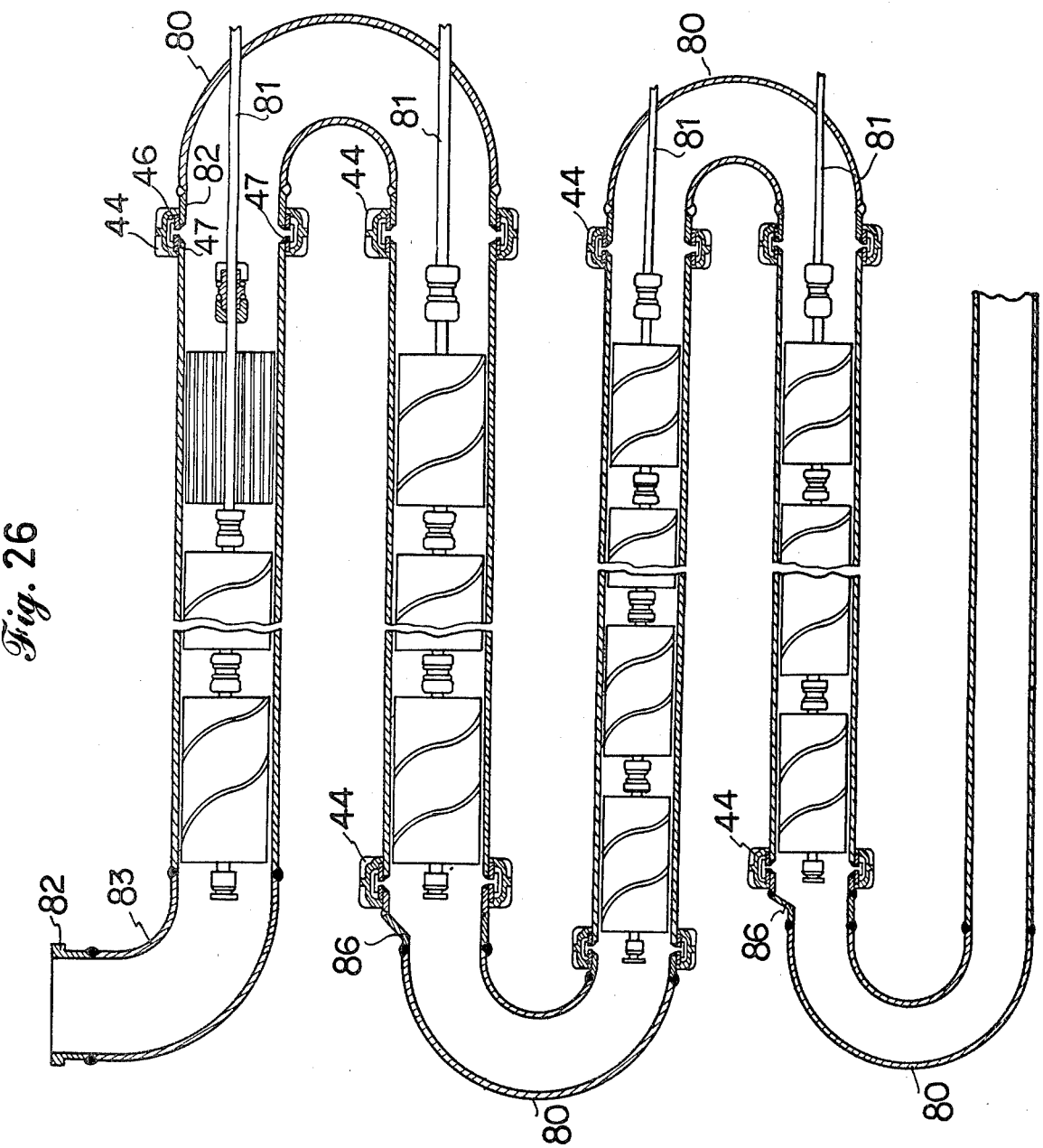
FIG. 26. The device of FIG. 24 with tubing reducers, showing three different sizes of pressure vessels.

Starting with the design which employs commercially available 180° tubing returns (FIGS. 24 & 25), I have eliminated the need for series-parallel manifolding by adding standard tubing reducers, as shown in FIG. 26. This design is essentially the same as shown in FIG. 24, except that reducers, item 86, have been employed to permit a number of different sizes of pressure vessels to be used in series, thereby maintaining high turbulence in spite of the fact that feed flow decreases due to the removal of quantities of permeate at each stage. In this figure, an eccentric reducer has been shown, though there is no reason that a concentric reducer should not be used, provided space and alignment considerations so permit.

In order to illustrate some of the possible core designs, Table I shows the characteristics of many of the combinations and permutations

TABLE I

Core sizes, numbers of internal tubes, sizes of internal tubes membrane areas, crossections and linear velocities

| Entry No. | Nominal pipe Size, inches | Pipe Schedule | Pipe I.D., (cm) | Number of Internal tubes | Approx. I.D. of tubes, (cm) | Approx. Max. outer membranes (M²/M) | Approx. max. internal membrane (M²/M) | Area Ratio inner/outer | Total membrane inner and outer (M²/M) | High pressure cross-section, (cm²) | Flow rate at 0.38 M/sec or 1.26 ft/sec. liters/min | Flow rate at 0.38 M/sec or 1.26 ft/sec. M³/day |
|---|---|---|---|---|---|---|---|---|---|---|---|---|
| 1 | 1½" | 5S | 4.50 | 6 | 1.2 | 0.13 | 0.23 | 1.8 | 0.36 | 9.48 | 21.0 | 31.1 |
| 2 | 2" | 5S | 5.70 | 18 | 1.0 | 0.17 | 0.57 | 3.4 | 0.79 | 17.6 | 40.0 | 57.8 |
| 3 | 2½" | 5S | 6.88 | 18 | 1.2 | 0.20 | 0.68 | 3.3 | 0.88 | 25.7 | 58.6 | 84.4 |
| 4 | 3" | 5S | 8.47 | 18 | 1.5 | 0.25 | 0.84 | 3.3 | 1.09 | 37.0 | 84.4 | 122 |
| 5 | 3" | 5S | 8.47 | 36 | 1.05 | 0.25 | 1.19 | 4.7 | 1.44 | 36.4 | 82.9 | 119 |
| 6 | 3" | 40 | 7.79 | 36 | 1.0 | 0.24 | 1.13 | 4.7 | 1.36 | 33.0 | 75.3 | 109 |
| 7 | 3½" | 10S | 9.01 | 36 | 1.2 | 0.29 | 1.36 | 4.6 | 1.65 | 46.6 | 106 | 153 |
| 8 | 3½ | 40 | 9.01 | 36 | 1.2 | 0.27 | 1.36 | 5.0 | 1.63 | 46.2 | 105 | 152 |
| 9 | 4" | 40 | 10.23 | 36 | 1.4 | 0.31 | 1.58 | 5.1 | 1.89 | 61.7 | 140 | 203 |
| 10 | 4" | 40 | 10.23 | 60 | 1.0 | 0.31 | 1.89 | 6.1 | 2.19 | 53.4 | 122 | 175 |
| 11 | 4" | 40 | 10.23 | 60 | 1.0 | — | 1.89 | — | 1.89 | 47.1 | 107 | 155 |
| 12 | 5" | 40 | 12.82 | 60 | 1.3 | 0.39 | 2.45 | 6.3 | 2.84 | 87.6 | 200 | 288 |
| 13 | 5" | 40 | 12.82 | 90 | 1.0 | 0.39 | 2.83 | 7.3 | 3.22 | 83.3 | 190 | 273 |
| 14 | 5" | 40 | | 90 | 1.05 | — | 2.97 | — | 2.97 | 77.9 | 178 | 256 |
| 15 | 6" | 40 | 15.41 | 90 | 1.2 | 0.47 | 3.39 | 7.2 | 3.86 | 111 | 254 | 366 |
| 16 | 6" | 40 | 15.41 | 126 | 1.05 | — | 4.16 | — | 4.16 | 109 | 249 | 358 |
| 17 | 8" | 40 | 20.27 | 168 | 1.2 | 0.63 | 6.33 | 10.1 | 6.96 | 203 | 461 | 665 |
| 18 | 8" | 40 | 20.27 | 162 | 1.2 | — | 6.10 | — | 6.10 | 183 | 417 | 602 |
| 19 | 8" | 40 | 20.27 | 210 | 1.05 | — | 6.93 | — | 6.93 | 181 | 415 | 597 |
| 20 | 8" | 40 | 20.27 | 264 | 0.93 | — | 8.29 | — | 8.29 | 179 | 409 | 589 |
| 21 | 8" | 40 | 20.27 | 324 | 0.83 | — | 8.45 | — | 8.45 | 175 | 400 | 576 |
| 22 | 8" | 40 | 20.27 | 390 | 0.75 | — | 9.19 | — | 9.19 | 172 | 395 | 566 |
| 23 | 8" | 40 | 20.27 | 462 | 0.68 | — | 9.87 | — | 9.87 | 167 | 383 | 551 |
| 24 | 8" | 40 | 20.27 | 540 | 0.60 | — | 10.18 | — | 10.2 | 153 | 348 | 501 |
| 25 | 8" | 40 | 20.27 | 624 | 0.55 | — | 10.78 | — | 10.8 | 148 | 338 | 487 |
| 26 | 8" | 40 | 20.27 | 714 | 0.50 | — | 11.21 | — | 11.2 | 140 | 320 | 460 |
| 27 | 10" | 40 | 25.5 | 390 | 1.0 | — | 12.25 | — | 12.3 | 306 | 698 | 1,006 |
| 28 | 12" | 40 | 30.3 | 540 | 1.0 | — | 16.96 | — | 17.0 | 424 | 967 | 1,392 |
| 29 | 12" | 40 | 30.3 | 624 | 0.93 | — | 18.23 | — | 18.2 | 424 | 966 | 1,392 |
| 30 | 12" | 40 | 30.3 | 714 | 0.86 | — | 19.29 | — | 19.3 | 415 | 946 | 1,362 |
| 31 | 14" | 40 | 33.3 | 624 | 1.0 | — | 19.60 | — | 19.6 | 490 | 1,117 | 1,609 |
| 32 | 14" | 40 | 33.3 | 714 | 0.95 | — | 21.31 | — | 21.3 | 506 | 1,154 | 1,661 |
| 33 | 16" | 40 | 38.1 | 912 | 0.98 | — | 28.08 | — | 28.1 | 688 | 1,568 | 2,258 |
| 34 | 18" | 40 | 42.9 | 1134 | 1.0 | — | 35.62 | — | 35.6 | 891 | 2,031 | 2,924 |
| 35 | 20" | 40 | 47.6 | 1380 | 1.0 | — | 43.35 | — | 43.4 | 1084 | 2,471 | 3,558 |
| 36 | 22" | 20 | 54.0 | 1794 | 1.0 | — | 56.36 | — | 56.4 | 1409 | 3,213 | 4,626 |
| 37 | 22" | 60 | 51.4 | 1650 | 1.0 | — | 51.84 | — | 51.8 | 1296 | 2,955 | 4,255 |
| 38 | 24" | 40 | 57.5 | 1944 | 1.0 | — | 61.07 | — | 61.1 | 1527 | 3,481 | 5,013 |
| 39 | 28" | 30 | 67.9 | 2784 | 1.0 | — | 87.46 | — | 87.5 | 2187 | 4,985 | 7,179 |
| 40 | 32" | 40 | 77.8 | 3564 | 1.0 | — | 112 | — | 112 | 2799 | 6,382 | 9,190 |
| 41 | 36" | 40 | 87.6 | 4674 | 1.0 | — | 147 | — | 147 | 3670 | 8,370 | 12,052 |
| 42 | 42" | 80S | 104.1 | 6480 | 1.0 | — | 204 | — | 204 | 5089 | 11,600 | 16,700 |
| 43 | 48" | 80S | 119.4 | 8580 | 1.0 | — | 270 | — | 270 | 6739 | 15,400 | 22,100 |
| 44 | 2½" | 5S | 6.88 | 7 | 1.600 | 0.356 | — | | 0.356 | 23.3 | 53.2 | 76.6 |
| 45 | 2½" | 40 | 6.27 | 7 | 1.600 | 0.356 | — | | 0.356 | 17.0 | 38.9 | 56.0 |
| 46 | | | | 19 | 1.34 | — | 0.76 | | 0.76 | 25.4 | 57.9 | 83.3 |

Entries 44 and 45 represent the standard ROpak 7 core design.
Entry 46 represents the standard Patterson-Candy design.

of cores which could be manufactured under this general principle. The pipe sizes shown range from 1½" to 48". At the bottom of this table are shown the characteristics of one commercially available internal and one commercially available external pressure tubular design.

Under 3" I have shown two different wall thicknesses, schedule 5S and 40, and two different numbers of internal tubes, 18 and 36.

Table I shows that, as the diameters of the pressure vessels increase, the ratio of the internal to external membrane surface increases. The external surface varies as the first power of the O.D., whereas the internal area varies approximately as the square of the O.D. In addition, as the size increases, the possiblity of damaging the external membrane increases, and dimensional considerations make it very difficult to cast a good membrane. Membranes are normally only 75 to 150 microns thick. While, for short cores, dip casting has been used (R-22), superior membranes are achieved by use of "extrusion" through rigid ring dies. With these dies, core elipticity must be carefully controlled to 25 to 50 microns maximum. It is every difficult to fabricate large porous cores with this degree of precision in their outside surfaces.

However, due to handling problems, and since the external membrane provides only a small portion of the total membrane on a large core, it is beneficial to omit the optional membrane (5) on the external surface of larger cores.

Figure 27:
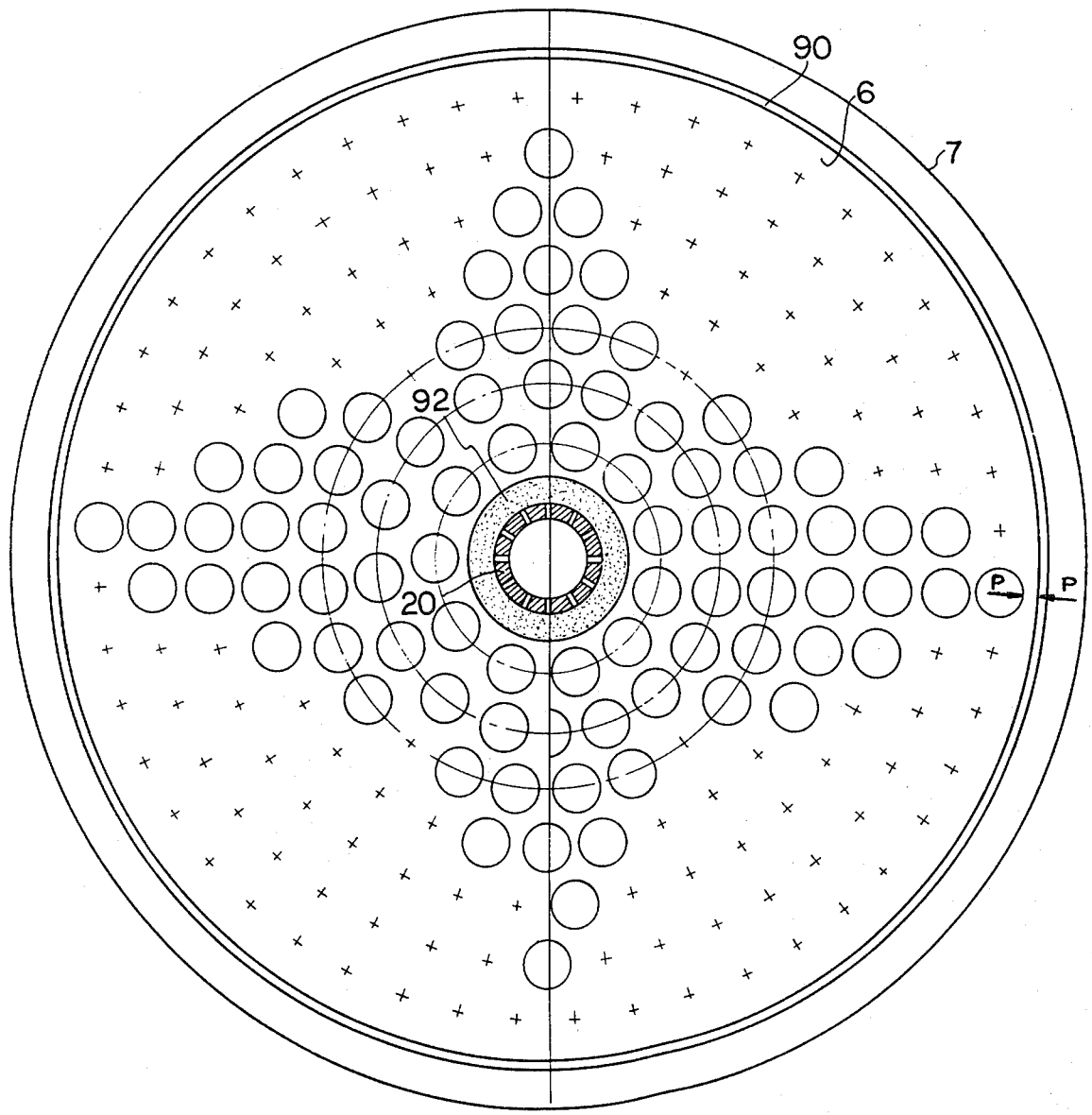
FIG. 27. Transverse cross sectional view of an 8" device, showing two possible arrangements for rows $n=2$ and $n=3$, the left side showing $m=5$ and the right, $m=6$. This figure also illustrates the composite substrate structure.

The right half of FIG. 27 shows a cross section of an 8" core in which there would be 210 internal tubular membrane coated surfaces and no outer membrane coated surface. For simplicity, the internal membranes, 4, have not been shown in this and subsequent figures. The outer surface may be sealed as in item 7, FIG. 1, or a thin metallic or plastic shell, 90, may surround the core.

Referring again to Table I, under the 8" entry I have shown one design with external membrane and eight different designs without external membrane. In the design with the external membrane, I have shown 216 internal tubular membrane coated surfaces, whereas the first of the designs without an external membrane has only 210 internal tubular surfaces. The reason for this whose circumference the centers of the tubes are located.

Calculating the length of the chords for various values of n, with $m=6$, we find the following relationships:

| | | |
|---|---|---|
| n = 1; | C = 2 × 1 × sin 60/2 = 2 × 0.5 = 1.00000; | A−C = 0.04720 |
| n = 2; | C = 2 × 2 × sin 30/2 = 4 × 0.25882 = 1.03528; | A−C = 0.01192 |
| n = 3; | C = 2 × 3 × sin 20/2 = 6 × 0.17365 = 1.04189; | A−C = 0.00531 |
| n = 4; | C = 2 × 4 × sin 15/2 = 8 × 0.130528 = 1.04421; | A−C = 0.00299 |
| n = 5; | C = 2 × 5 × sin 12/2 = 10 × 0.104528 = 1.04528; | A−C = 0.00192 |
| n = 10; | C = 2 × 10 × sin 6/2 = 20 × 0.052336 = 1.04672; | A−C = 0.00047 |
| n = 20; | C = 2 × 20 × sin 3/2 = 40 × 0.026177 = 1.04708; | A−C = 0.00012 | difference is that, with increasing volume of permeate, it is necessary to increase the diameter of the permeate duct. In order to accommodate the larger duct, it was necessary to omit the inner row of tubular surfaces.

Figure 28:
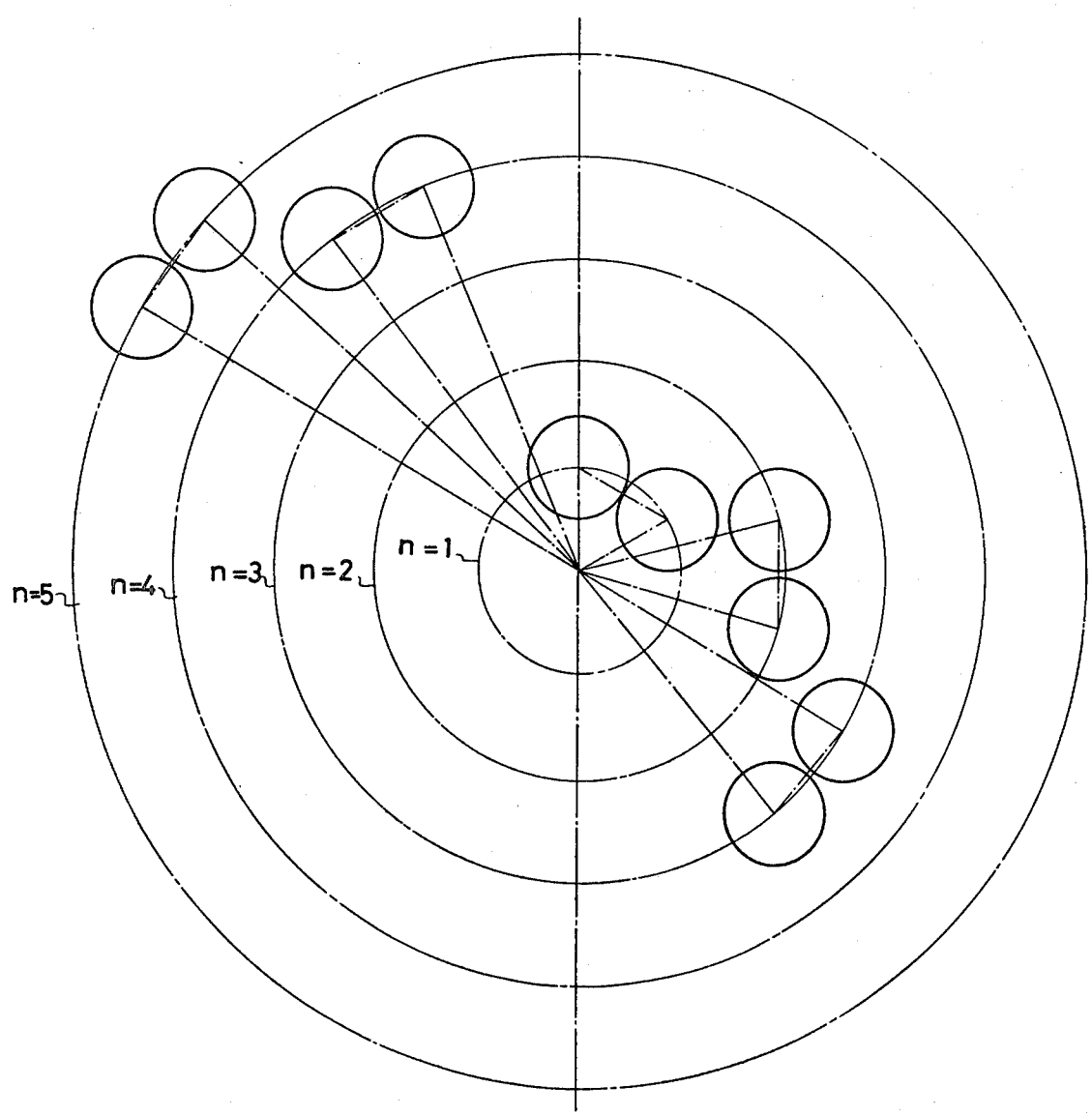
FIG. 28. Geometric illustration of the spacing relationships of rows $n=1$ through $n=5$, with the radius of the tubes equal to ½ the radius of circle $n=1$.

Another problem developed as the size of the cores increased. This problem resulted from the geometrical limitation on the clearance between tubes in the first row. As an hypothetical example, if the diameter of the tubes in this inner row were equal to their distance from the center line, they would be tangent to one another and no flow of permeate could pass from the outer rows to the permeate duct. For example, if the first row of tubes were to be located on a circle 1 centimeter from the central axis, and if the tubes were 1 cm in diameter, placed every 60°, they would touch, and there would be no space for porous substrate between them. On the other hand, if the centers of the tubes on the second row of said core were to be on a circle 2 centimeters in diameter, and one centimeter tubes were to be placed every 30° around the circle, a small clearance would exist between tubes, as shown in FIG. 28. The center-to-center distance between these tubes is 4 sin 15°=1.0353. Since the radius of the cores is only 0.5 centimeters, a clearance of 2(0.518−0.500)=0.036 would exist. Similarly, in the third row, 18 tubes would be placed 20° apart and the distance between centers would be 6 sin 10°=1.0419 cm. The clearance between adjacent one centimeter tubes would be 2(0.521−0.500)=0.042 cm. Therefore, it is seen that, for rows beyond the first row, there is a significantly larger clearance available for permeate to flow toward the permeate duct. This phenomenon is best seen in the difference between the arcs and the chords, as follows:

$$A = \frac{2mnR_1\pi}{6mn} = \frac{\pi R_1}{3}, \text{ where} \qquad \text{Eq. 1}$$

where
A is the length of the arc between centers of adjacent tubes,
n is the row number,
m is the number of tubes in row n, and
$R_1$ is the radius of row $n=1$.
Assuming $R_1 = 1.0$ cm, $$A = \pi/3 = 1.047198$$

$$C = 2n \sin \theta/2, \qquad \text{(Eq. 2)}$$

where
C is the length of the chord between the centers of adjacent tubes, and
$\theta$ is the angle subtended by the lines connecting the centers of the tubes with the center of the circle on whose circumference the centers of the tubes are located.

It is thus demonstrated that, as the relative distance from the center increases, the length of the chord approaches that of the arc.

One solution to this problem is to have the tubes in the first row slightly smaller than those in rows 2 and above. However, the flow rate in the smaller tube would be lower, resulting in poorer rejection. In marginal cases, it would result in preferential fouling of the membranes in the smaller tubes. I therefore prefer to have all tubes the same diameter. For Ultra Filtration, where the flux is particularly high, I have found that, even with the smaller sizes of cores, such as the 3", Schedule 5S, 36 tube design shown on Table I (entry 5), it is frequently beneficial to omit one of the tubes in the central row, reducing the total number of tubes to 35; the area of internal membrane is thereby decreased from 1.19 to 1.16 $M^2/M$ and the total membrane decreased from 1.44 to 1.41 $M^2/M$, a loss of only 2%.

Figure 29:
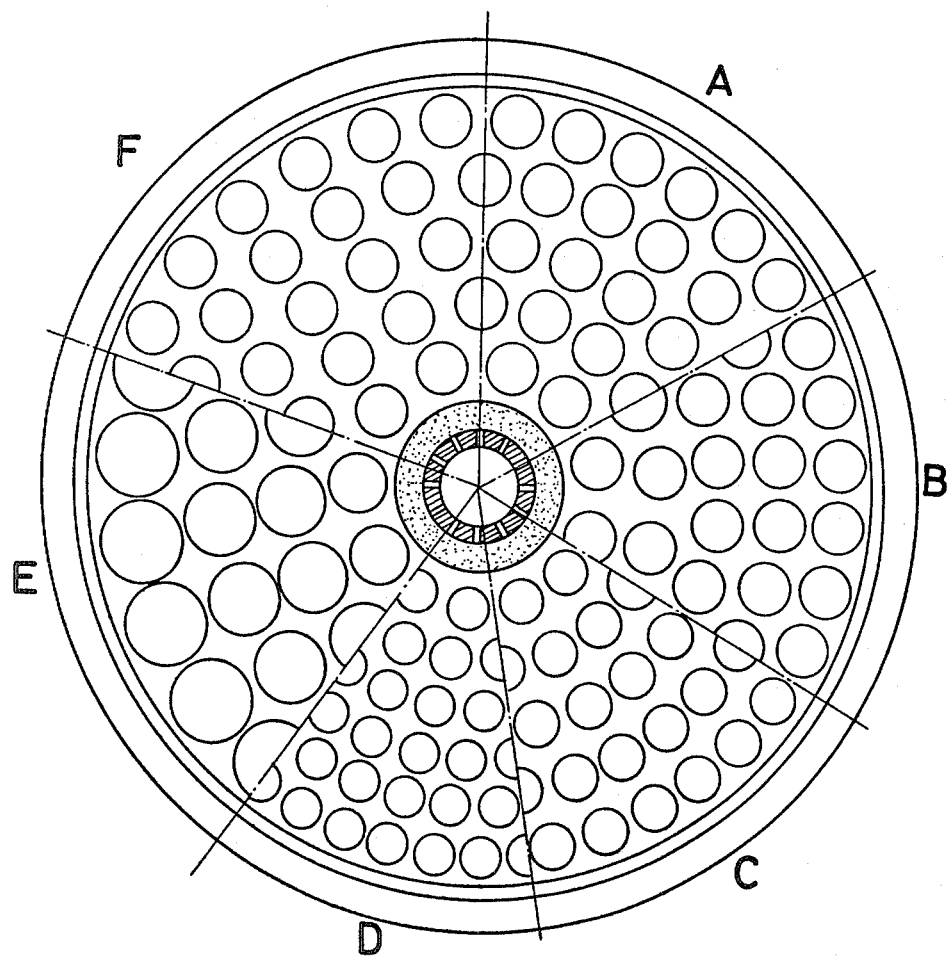
FIG. 29. Illustrations of the structures resulting when $m=5$, 6 and 7.

The simplest design is based upon six tubes in the first row and six more tubes in each subsequent row of a core. In order to show the effect of a larger or smaller increment, FIG. 29 is presented. In this figure, a 6" pipe is illustrated. The symbol "n" is again used to represent the row number, and "m", the number of tubes in each row. In the smallest circle shown, $n=2$; Row $n=1$ has been omitted. In section A, $m=6$. In sections C and D, $m=7$ and in rows E and F, $m=5$.

The diameter of the tubes in sections A, B and F is the same. In section F (where $m=5$), it is apparent that there is much lost space between tubes in the same row, resulting in a lower packing density than in section A. (There are some potential benefits from this increased space, especially in the case of Ultra Filtration, where flux rates are very high.) In Section E, in order to take advantage of the available space in row $n=2$, the diameter of the tubes in row $n=2$ have been increased. However, it was then necessary to increase the diameter of the circle $n=3$. This increase made it possible to further increase the diameter of tubes in row $n=3$. Accordingly, the diameter of the circle $n=4$ had to be increased, making possible a further increase in the diameter of the tubes in row $n=4$. Ultimately, the diameter of the tubes in row $n=5$ grew to 1.6 times the diameter of the standard tubes in sections A and F, and the circle $n=6$ was lost. Since, as previously noted, it is undesirable to have more than one size of tube in a core, the design shown in Section E would not be desirable for RO.

Next, referring to Section C, with the increased number of tubes in each row ($m-7$), it was necessary to decrease the diameter of the tubes to compensate for the loss of clearance. It is therefore seen that there is increased clearance between rows in section C. Such an increase provides no benefit.

In Section D, in order to reduce the unused space between rows, the diameter of the circle n=3 has been reduced. However, as a result, the diameter of the tubes in row n=3 had to be reduced to preserve the clearance between adjacent tubes. In a manner similar to that demonstrated in section E, the diameter of circles 4 through 6 were further reduced requiring additional and progressive reductions in the diameter of the tubes. An extra row, n=7, was added. It is thereby demonstrated that, when m=7, an undesirable RO design results. Either space is lost between rows or multiple tube sizes result.

In section B is shown an alternate design in which, for rows n=2 and n=3, m=5. This concept is beneficial for very large cores, especially when there is limited porosity of the substrate. For rows n=4, 5 and 6, of section B, m=6.

The number of tubes in designs of this type is given by the following equation:

$$X = m(n^2 + n/2), \quad \text{(Eq. 3)}$$

where n is the total number of rows of tubes, m is the number of tubes in each row and X is the total number of tubes.

As has been shown in FIG. 28, there is restricted space in row 1. Therefore, for the maximum packing density (with uniform tubing sizes) if row 1 is to be used, it is often desirable to employ only 5 tubes in this row. Therefore, if m=5 when n=1, the total number of tubes is X−1. If row 1 is omitted, the total number of tubes is X−6.

In order to maximize the internal clearance between tubes, it is beneficial to displace the centers of the tubes in adjacent rows. In so doing, I prefer to place the center of the first tubes in odd numbered rows at 0°, displacing the center of the first tubes in the even numbered rows by half the angle between tubes in those rows. Table II shows the progression of the number of tubes and their arrangement.

For good packing density, the sizes of the progressive circles is given by the following equation:

$$R_n = nR_1, \quad \text{(Eq. 4)}$$

where
$R_1$ is the radius of the circle for row n=1,
n is the row number and $R_n$ is the radius of row n.

Referring again to FIG. 28, the clearance in row n=x can be found by the equation $$(R_t + S_x/2/R_x) = \sin \theta/2, \quad \text{(Eq. 5)}$$

where
$R_t$ is the radius of the tubes, $S_x$ is the clearance between adjacent tubes in the row in which n=x, $R_x$ is the radius of the row n=x and $\theta$ is the angular spacing between tubes. For row n=4, $\theta=15°$.

By rearranging and solving for $S_x$, the following equation results:

$$S_x = 2(R_x \sin \theta/2 - R_t)$$

$$S_4 = 2(0.1305 R_4 - R_t) \quad \text{(Eq. 6)}$$

I prefer to maintain $R_t$ between 0.5 and 2.0 cm and S between 0.1 and 0.6 cm, depending upon core size, substrate permeability and membrane

TABLE II

Number of internal tubular surfaces per row and per core, angular spacing and location of first tube in each row., upon condition in which m = 6.*

| Row number, (n) | Number of tubes in row, (6n) | Total number of tubes in core, (X) | Location of first tube in row n. | Angular spacing of tubes in row n, (Y) |
|---|---|---|---|---|
| 1 | 6 | 6 | 0° | 60° |
| 2 | 12 | 18 | 15° | 30° |
| 3 | 18 | 36 | 0° | 20° |
| 4 | 24 | 60 | 7.5° | 15° |
| 5 | 30 | 90 | 0° | 12° |
| 6 | 36 | 126 | 5° | 10° |
| 7 | 42 | 168 | 0° | 8.57° |
| 8 | 48 | 216 | 3.75° | 7.5° |
| 9 | 54 | 270 | 0° | 6.67° |
| 10 | 60 | 330 | 3° | 6° |
| 11 | 66 | 396 | 0° | 5.45° |
| 12 | 72 | 468 | 2.5° | 5° |
| 13 | 78 | 546 | 0° | 4.62° |
| 14 | 84 | 630 | 2.14° | 4.29° |
| 15 | 90 | 720 | 0° | 4° |
| 16 | 96 | 816 | 1.88° | 3.75° |
| 17 | 102 | 918 | 0° | 3.53° |
| 18 | 108 | 1026 | 1.67° | 3.33° |
| 19 | 114 | 1140 | 0° | 3.16° |
| 20 | 120 | 1260 | 1.5° | 3° |
| 21 | 126 | 1386 | 0° | 2.86° |
| 22 | 132 | 1518 | 1.36° | 2.73° |
| 23 | 138 | 1656 | 0° | 2.61° |
| 24 | 144 | 1800 | 1.25° | 2.5° |
| 25 | 150 | 1950 | 0° | 2.4° |
| 30 | 180 | 2790 | 1.° | 2° |
| 34 | 204 | 3570 | 0.88° | 1.76° |
| 35 | 210 | 3780 | 0° | 1.71° |
| 39 | 234 | 4680 | 0° | 1.54° |
| 40 | 240 | 4920 | 0.75° | 1.5° |
| 45 | 270 | 6210 | 0° | 1.33° |
| 46 | 276 | 6486 | 0.65° | 1.30° |
| 50 | 300 | 7650 | 0.6° | 1.2° |

*number of tubes in row n is 6n since, for this table, m = 6.
Equation for total number of tubes;

$$X = 6 \frac{n^2 + n}{2}.$$

Equation for spacing of tubes;

$$Y = \frac{360°}{6n}$$

Location of first tube on even numbered rows = Y/2
In practive, it is prefereble to place only 5 tubes in row n = 1. In such cases the angular spacing is 72° and the total number of cores is X − 1. In other cases, the row n = 1 is omitted, and the total number of tubes is X − 6. When row n = 1 is omitted and m = 5 for row n = 2, the angular displacement for row n = 2 is 36° and the total number of tubes is X − 8.

flux. Within these constraints, the maximum value of $R_t$ is calculated using Equation 5.

The simplest way to lay out a tube array is on polar coordinate graph paper. To convert the design to a form suitable for manufacturing, the locations of tube centers may be mathematically expressed in polar coordinates, with templates being cut on an N/C vertical boring mill, using a computer transformation of polar to rectangular coordinates.

Figure 30:
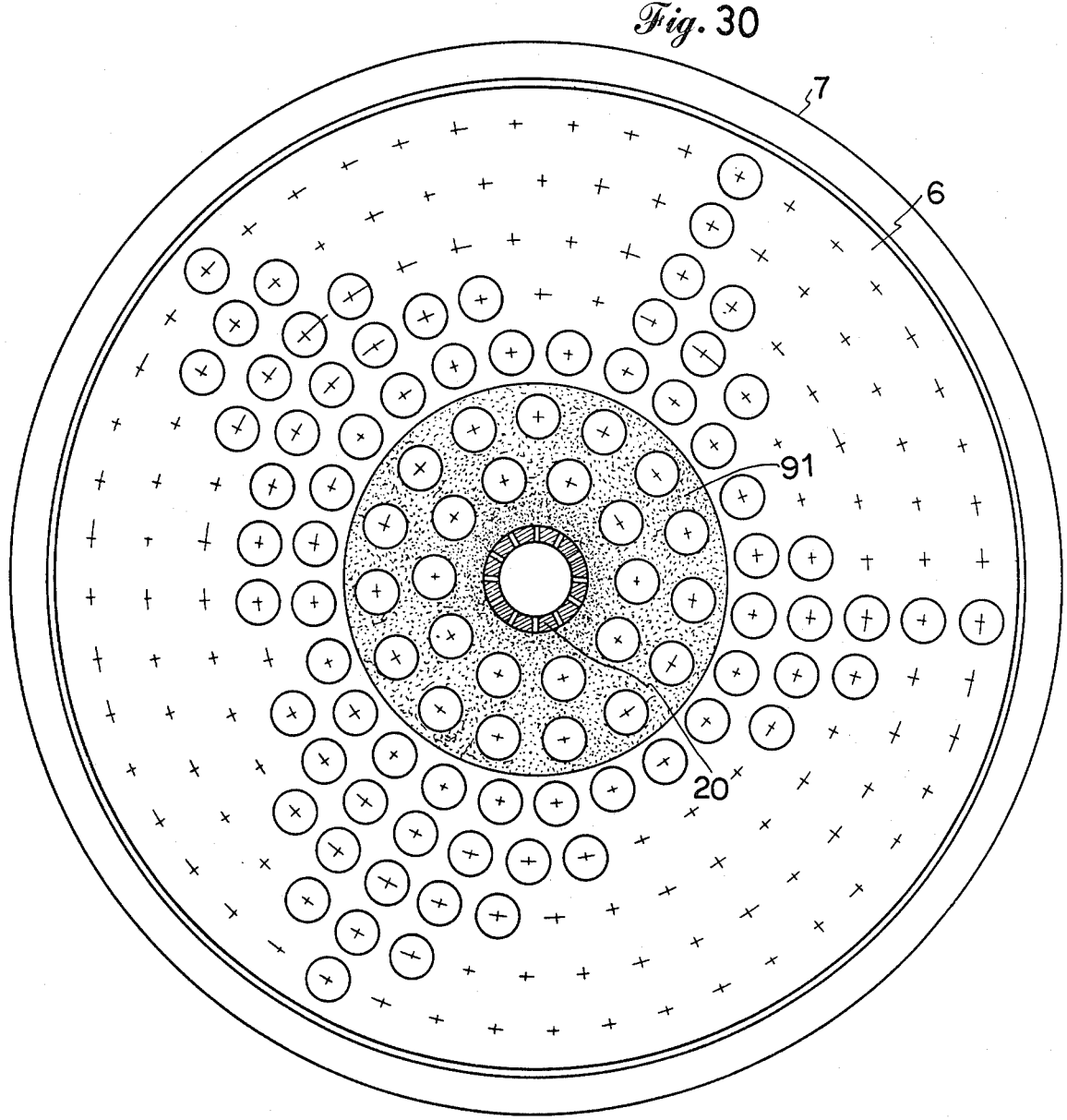
FIG. 30. Composite core structure with $m=0$ for $n=1$, $m=5$ for $n=2$ and 3, and $m=6$ for $n=4$ through 8. Higher density substrate extending past row $n=3$.

As will be shown below, unbalanced compressional forces are restricted to the space within the center line for the innermost circle of tubes. For cores up to 2", it is best to use the more rigid of the available porous substrates. However, for larger cores, it is possible to make use of a composite substrate structure in which a substrate with lower compressional strength and greater flexibility (larger pore size, higher void volume and lower elastic modulus) is built up on a precast 2" or 3" core. For example, for nuclear applications, a 2" or 3" sintered polyethylene core can form the central portion of a 12" core in which the outer portion is composed of a semi rigid plastic foam. Such a core possesses superior characteristics for shipping, handling and installation. Similarly, for potable water applications, a 2" or 3" sintered silica core can support a similar plastic foam core of larger diameter. Such a design is illustrated in FIG. 30, in which, for the central section, m=5, and n=2 and 3. The more dense central substrate is shown as item 91. Or, a central section of substrate up to 3 cm in diameter, with no tubes except the permeate duct, can be used to carry a portion of the higher unbalanced force within the innermost circle of tubes. Such a central section is shown as item 92, FIG. 27. As previously noted, for larger sizes no tubes are used in the row n=1, so that it is only required that the central core be small enough so that it would not conflict with the tubes in the second row. The 3 cm dimension satisfies this requirement for the designs shown in FIG. 27. By use of this composite core design, the unbalanced internal mechanical forces are carried by the central substrates, which are best able to withstand them.

A decrease in manufacturing costs also results from the use of these composite cores. Tooling costs, fabricating costs and energy consumption are much lower for some of the softer or less dense materials employed in the outer portion of the larger sizes. Core weight, and the attendant handling difficulties, are also substantially reduced.

In FIG. 27, vectors "P" illustrate the way in which system pressure is applied uniformly to the internal and external surfaces of core 1. The force on the internal surface, for a one centimeter length of core, may be expressed by the equation for hoop stress, as follows:

$$F_i = 2R_i \Delta P \text{ cm.,} \quad \text{(Eq. 7)}$$

$F_i$ is the internal force,
$R_i$ the radius of the internal surface, and
$\Delta P$ the pressure differential.

The manner in which the external force is carried is empherical, and relates to such variables as the void volume, pore size and elastic modulus of the substrate 6. With closely packed, high elastic modulus substrates, very little yielding takes place in the substrate. A thin tangential layer of the external surface carries the unbalanced compressional force. In the absence of yielding, these forces are not propogated into the internal portion of the substrate.

Equations for expressing this phenomenon quantitatively are not available for heterogeneous substances. The magnitude of this component must equal the difference between the two forces as follows:

$$F_t = 2\Delta P(R_e - R_i) \text{ cm.,} \quad \text{(Eq. 8)}$$

$F_t$ is the tangential component and $R_e$ is the radius of the external surface.

The balance of the internal and external forces is transmitted directly from one surface to the other, through point-to-point contacts within the substrate.

In analyzing the variables in balanced pressure, tubular RO designs, it is necessary to differentiate between the loading within the granules of the porous substrate, as explained above, and the fluid pressure differentials within the porous channels between granules. While the mechanical system may be in static balance, the fluid within the passages in the substrate constitutes a separate, dynamic hydraulic system, subject to analysis by established techniques.

In order to evaluate the phenomena which occur within the static mechanical system, without the complications introduced by the hydraulic system, it is valuable to consider a hypothetical core in which all surfaces exposed to system pressure are sealed against fluid passage, i.e., a core without membrane and with no fluid flow within the porous substrate. Next, we assume that the permeate duct communicates with the atmosphere, so that the pressures within the permeate duct and in the voids within the porous substrate, are Zero (gauge).

Under such circumstances, the compressional loads are seen to be in balance in all parts of the core, with one exception. Within the center line circle on which the centers of the innermost row of tubes is located, a compressional force imbalance exists. For example, referring to the right side of FIG. 27, a mechanical pressure imbalance exists in the substrate located within the innermost circle of tubes. With substrates possessing high elastic moduli, low void volumes and small particle sizes, this mechanical load is dissipated within the first few layers of the substrate granules on the convoluted profile, within the center line circle (n=2). In other words, along the inner half of the circumferences of the innermost row of tubes, and in the zone where the centerline circle passes from tube to tube.

These compressional forces do not propagate toward the permeate duct unless the substrate is composed of low elastic modulus, loosely compacted, high void volume or large particle size substances, or a combination of these effects, referred to herein as "less dense substrates". In cases where these less dense substrates are employed, the compressional forces would not penetrate past the more dense, composite, inner substrate shown as item 92 of FIG. 27.

Having thus analyzed the mechanical forces within the substrate, additional analyses may be made of the flow of a fluid through the membrane and, thereafter, through the interstices between the solid substances of which the porous substrate is composed. These phenomena are described in a later portion of this specification.

It is thus seen that the core constitutes a system in which three separate phases exist, namely, (1) a continuous solid phase through which (2) a continuous aqueous phase passes, and, (3) the membrane. In some cases there is a discontinuity in the liquid system at the point at which a portion of the pressurized feed liquid passes into the semipermeable membrane, as will be explained in the next section. If such a discontinuity exists for high rejection membranes, such is not the case for ultrafiltration membranes. Therefore, the fluid system may be considered to consist of (1) a pressurized aqueous mixture, (2) a membrane acting, in some ways, like an orifice plate, (3) a series of labyrinth passages and, (4) a low pressure collecting duct for the aqueous phase passing through the system.

Having thus segregated the four different zones of the system, we next turn to a description of the nature of membranes and the passage of water through them. Membranes normally consist of a skin measuring approximately 0.25 microns in depth, supported by a spongy layer approximately 100 microns in depth. The flow velocity or flux through a membrane in my device is given by the following equation:

$$v = k_m(P_f - P_p - \Delta\pi - \Delta P_s), \quad \text{(Eq. 9)}$$

v = linear velocity (cm/sec), or flux (ml/cm²/sec)
$P_f$ = Feed pressure (kg/cm²)

$P_p$ = Permeate pressure
$\Delta\pi$ = Differential osmotic pressure, feed solution minus permeate (kg/cm$^2$)
$\Delta P_s$ = pressure drop within the porous substrate.
$k_m$ = membrane constant (cm$^3$/gm/sec)

For my device, the value of $k_m$ will vary from 1 to $5\times10^{-8}$ cm$^3$/gm/sec, for membranes with a nominal rejection between 98% and 80%.

In reverse osmosis (as contrasted with ultrafiltration), a widely held theory suggests that the process of the passage of water through the skin of a cellulose acetate membrane involves molecular phenomena in which water molecules associate with acetate groups, and then migrate progressively from one acetate group to another, driven by the net pressure differential (v/km), until they emerge into the open, spongy layer beneath the skin.

Accordingly, unless the value of $\Delta P_s$ is significant when compared with $P_f - P_p - \Delta\pi$, the entire pressure drop may be thought of as occurring within the membrane skin.

In order to estimate the magnitude of the internal pressure drop within cores of various compositions and fluxes, the following analysis is offered:

The most critical internal flow rate is that which occurs between adjacent tubes in either the row closest to the permeate duct or the first row in which m=6. To determine the magnitude of this flow rate, it is first necessary to estimate the area of membrane outboard of the point of closest approach between adjacent tubes. For a 1 meter length of core, this value may be calculated as follows:

$$A_e = \sum_{n_x}^{n_n} 2\pi R_t \left( \frac{n_x m_x}{2} + n_{x+1} m_{x+1} + \ldots + n_n m_n \right) \times \frac{1M}{100}, \text{ where} \quad \text{Eq. 10}$$

$R_t$ is the radius of tubes (cm)
$n_x$ is the value of n in the row for which the inter-tube flow velocity is being estimated.
$m_x$ is the value of m in that row.
$n_{x+1}$ and $m_{x+1}$ are the values of m and n in the subsequent row.
$m_n$ and $n_n$ are the values of m and n in the largest row.
$A_e$ is the area of membrane in a meter of core outboard of the circle n=x, expressed M$^2$ The flow rate is given by the following expression:

$$v = (FA_e/8.64 \, m_x n_x S_x), \quad \text{(Eq. 11)}$$

where
$S_x$ = the space between the tubes in row where n=x, expressed in cm.
F = flux in M$^3$/M$^2$/day
v = flow rate (ml/cm$^2$/sec), (or cm/sec)

The value of $S_x$ may be calculated as follows (see FIG. 28):

$$(R_t + S_x/2)/R_x = \sin(360/2m_x n_x) \text{ (from Eq. 5)} \quad \text{(Eq. 12)}$$

$$S_x = -2(R_t - R_x \sin \frac{360}{2m_x n_x}) = -2(R_t - R_x \sin \frac{360}{2\,m_x n_x}) \quad \text{Eq. 13}$$

For example, take the core represented in the right side of FIG. 27. In this case, the row closest to the center is n=2, in which m=6. There are 198 tubes in rows 3 through 8. Add to this $m_2 n_2/2$ or $6\times2/2 = 6$ extra tubes, making 204 tubes outboard of the circle n=2. Assuming $R_t = 0.5$ and $R_1 = 1.15$, $R_2 = 2\times1.15$, $$S_2 = -2(0.50 - 2 \times 1.15 \sin \frac{360}{2 \times 6 \times 2})$$

$$S_2 = -2(0.50 - 2.3 \sin 15°) = -2(0.51 - 2.3 \times 0.2588) = -2(0.50 - 0.59528)$$

$$S_2 = -2(-0.09528) = 0.19056$$

Assume a flux of 1 M$^3$/M$^2$/day, $$A_e = (2\pi/100) R_t \times 204 = 6.41 \, M^2$$

Now, $$v = \frac{FA_e}{8.64 \times 6 \times 2 \times 0.191} = \frac{1 \times 6.41}{8.64 \times 6 \times 2 \times 0.191} = \frac{6.41}{0.33} = 0.323 \text{ ml/cm}^2/\text{sec}$$

For the left side of FIG. 27, in row n=2, m=5, the number of tubes outboard the circle n=2 would be as follows:
Row n=2, 5/2; row n=3, 15; rows n=4 through 8, 180; the total is therefore 197.5.

$$S_2 = -2(0.50 - 2.3 \sin \frac{360}{2 \times 5 \times 2}) = -2(0.50 - 2.3 \sin 18°)$$

$$S_2 = -2(0.50 - 2.3 \times 0.3090) = -2(0.50 - 0.710) = -2(-0.211) = 0.421$$

$$A_e = (2\pi R_t/100) \times 197.5 = 6.20 \, M^2$$

$$v = (6.20/8.64 \times 5 \times 2 \times 0.421) = 0.170 \text{ ml/cm}^2/\text{sec}$$

For either side of FIG. 27, row n=4, the following is a calculation of the velocity of flow:

The number of tubes in row n=4 is 24/2; for rows n=5 through n=8, there are 156 tubes; total outboard is 168.

$$S_4 = -2(0.50 - 4 \times 1.15 \sin \frac{360}{2 \times 6 \times 4}) = -2(0.50 - 4.6 \sin 7.5)$$

$$S_4 = -2(0.50 - 4.6 \times 0.1305) = -2(0.50 - 0.600) = 2 \times 0.100 = 0.20$$

$$A_e = (2\pi R_t/100) \times 168 = 5.28 \, M^2$$

$$v = (5.28/8.64 \times 6 \times 4 \times 0.20) = 0.127 \text{ ml/cm}^2/\text{sec}$$

In a similar manner, the outboard areas, intertube spacing and intertube flow rates were calculated for the other rows of the core illustrated in FIG. 27. The results of these calculations are summarized in Table III.

Having thus established the flow rate at the point of nearest approach, it is next necessary to make use of Darcy's equation in order to determine the pressure drop.

$$dP/dt = \alpha \mu v/g_c, \quad \text{(Eq. 14)}$$

where
$\alpha$ = viscous resistance coefficient for a porous medium (cm$^{-2}$)

$\mu$ = viscosity of fluid, in this case, water, at 0.010 poise = 0.010 gm sec$^{-1}$ cm$^{-1}$ v = superficial velocity of fluid (cm/sec or ml cm$^{-2}$sec$^{-1}$)

$g_c$ = gravitational constant (981 cm/sec$^2$)

Nickelson, et al (R-22) measured the viscous resistance for three highly porous candidate materials for external pressure RO cores.

These values of $\alpha$ are as follows:

sintered polyvinylidene fluoride, 25 micron pore size, $\alpha = 2.7 \times 10^5$ cm$^{-2}$ sintered polyethylene, 10 micron pore size, $\alpha = 1.2 \times 10^6$ cm$^{-2}$ ceramic, 1 micron pore size, $\alpha = 3.6 \times 10^6$ cm$^{-2}$ Using these values for $\alpha$, the value of dP was integrated for the passage of water between adjacent tubes of radius $R_t$, in row n=2, separated by the distance $S_n$. These values are also shown in Table III. As can be seen, for an 8 inch core with a flux of 1 M$^3$/M$^2$/day, with these substrates, very little internal pressure drop would occur, even in ultrafiltration applications with twice the flux used in this analysis.

In the same manner, the viscous resistance coefficient was calculated for the ceramic material used for external pressure cores, and for a nominally rated 2 micron, sintered polyethylene filter cartridge.

They were as follows:

sintered polyethylene from 2 micron nominal filter, $\alpha = 6.2 \times 10^8$ cm$^{-2}$ external tubular RO ceramic core, (0.1 to 0.5 microns) $\alpha = 2.1 \times 10^{12}$ cm$^{-2}$.

flowing through the inter-tube zone, as seen in Table III.

Next, this same analysis was performed for row n=2 of larger cores, using m=5 and m=6. The results are shown in Table IV.

In the above analyses, the velocity of the fluid at the point of nearest approach of adjacent tubes is correct. There is a small increase in the total fluid flow after the point of nearest approach, and a slightly smaller total flow approaching this point, due to the contribution of the row of tubes being analyzed. However, these effects are opposite and virtually compensate for one another. Therefore, the use of the average flow volume to estimate the pressure drop by integrating dP across the gap $R_t$ to $-R_t$ is justified.

With respect to higher or lower flux rates, the anticipated flow rates and pressure drops can be estimated by multiplying the values shown in Tables III and IV by the flux in M$^3$/M$^2$/day.

In order to demonstrate the low relative pressure drop in substrates as compared to membranes, it is valuable to compare equations 9 and 14.

$$dP/dt = (\alpha \mu v / g_c) \qquad \text{(Eq. 14)}$$

$$v = k_m(P_f - P_p - \Delta\pi - \Delta P_s) \qquad \text{(Eq. 9)}$$

Rearranging equation 9 we find, $$P_f - P_p - \Delta\pi - \Delta P_s = v/k_m$$

TABLE III

Internal pressure drops for 8" cores, n = 2 to 8; m = 5 or 6.

| | | | | | | | $R_t$ dP (kg/cm$^2$ for a flow of $-R_t$ 2$R_t$ or 1 cm) | | |
|---|---|---|---|---|---|---|---|---|---|
| n | m | out board membrane area (M$^2$/M) | $S_n$ (cm) | V (ml/cm$^2$/sec or cm/sec) | polyvinylidine fluoride, 25$\mu$ | polyethylene, 10$\mu$ | ceramic 1$\mu$ | polyethylene, 2$\mu$ nominal | ceramic 0.1-0.5$\mu$ |
| 2 | 6 | 6.41 | 0.191 | 0.323 | 0.00052 | 0.0023 | 0.0069 | 1.19 | 4,000 |
| 3 | 6 | 5.94 | 0.198 | 0.193 | 0.00032 | 0.0014 | 0.0043 | 0.73 | 2,500 |
| 2 | 5 | 6.20 | 0.421 | 0.170 | 0.00034 | 0.0015 | 0.0045 | 0.78 | 2,600 |
| 3 | 5 | 5.89 | 0.434 | 0.052 | 0.00011 | 0.00049 | 0.0015 | 0.25 | 847 |
| 4 | 6 | 5.28 | 0.200 | 0.127 | 0.00021 | 0.00095 | 0.0028 | 0.49 | 1,600 |
| 5 | 6 | 4.43 | 0.202 | 0.085 | | | | | |
| 6 | 6 | 3.39 | 0.203 | 0.054 | | | | | |
| 7 | 6 | 2.17 | 0.203 | 0.030 | | | | | |
| 8 | 6 | 0.75 | 0.203 | 0.0009 | | | | | |

The latter ceramic material is far too dense to be considered for even moderate sized, balanced pressure tubular RO cores. However, using the 2 micron nominal polyethylene and m=5 for n=2, a moderate pressure drop of 0.78 kg/cm$^2$ was realized for the permeate Replacing $P_f - P_p - \Delta\pi - \Delta P_s$ with $\Delta P_n$, the net driving pressure, $$\Delta P_n = v/k_m$$

Comparing this equation with equation 14, it is possible to convert equation 9

TABLE IV

Internal pressure drops for various core sizes, n = 2; m = 5 or 6

| | | | | | Internal flow rate, V, (ml/cm$^2$/sec or cm/sec) | $R_t$ dP (kg/cm$^2$ for a flow of $-R_t$ 2$R_t$ or 1 cm) | | | |
|---|---|---|---|---|---|---|---|---|---|
| Nominal Pipe Size, inches | m | n | Outboard Membrane Area (M$^2$/M) | $S_n$ (cm) | | polyvinylidine fluoride 25$\mu$ | polyethylene 10$\mu$ | ceramic 1$\mu$ | polyethylene 2$\mu$ nominal |
| 8" | 6 | 2 | 6.41 | 0.191 | 0.32 | 0.00052 | 0.00023 | 0.0069 | 1.19 |
| 8" | 5 | 2 | 6.20 | 0.421 | 0.17 | 0.00034 | 0.00015 | 0.00046 | 0.73 |
| 12" | 6 | 2 | 16.8 | 0.191 | 0.84 | 0.0014 | 0.0063 | 0.019 | 3.24 |
| 12" | 5 | 2 | 16.7 | 0.421 | 0.46 | 0.00091 | 0.0041 | 0.012 | 2.10 |
| 18" | 6 | 2 | 34.4 | 0.191 | 1.8 | 0.0029 | 0.013 | 0.039 | 6.7 |
| 18" | 5 | 2 | 34.4 | 0.421 | 0.97 | 0.0019 | 0.0086 | 0.026 | 4.4 |
| 24" | 6 | 2 | 60.9 | 0.191 | 3.0 | 0.0049 | 0.022 | 0.066 | 11 |
| 24" | 5 | 2 | 60.9 | 0.421 | 1.7 | 0.0033 | 0.015 | 0.045 | 7.5 |

TABLE IV-continued

Internal pressure drops for various core sizes, n = 2; m = 5 or 6

| Nominal Pipe Size, inches | m | n | Outboard Membrane Area (M²/M) | $S_n$ (cm) | Internal flow rate, V, (ml/cm²/sec or cm/sec) | $-R_t$ polyvinylidine fluoride 25μ | $R_t$ $\int_{-R_t}^{R_t} dP$ (kg/cm² for a flow of 2$R_t$ or 1 cm) polyethylene 10μ | ceramic 1μ | polyethylene 2μ nominal |
|---|---|---|---|---|---|---|---|---|---|
| 36" | 6 | 2 | 146.6 | 0.191 | 7.4 | 0.012 | 0.054 | 0.161 | 27 |
| 36" | 5 | 2 | 146.6 | 0.421 | 4.0 | 0.008 | 0.036 | 0.108 | 18 |
| 48" | 6 | 2 | 269.3 | 0.191 | 14. | 0.0022 | 0.098 | 0.293 | 50 |
| 48" | 5 | 2 | 269.3 | 0.421 | 7.4 | 0.015 | 0.066 | 0.198 | 34 | to a form subject to analysis by Darcy's equation. The so-called "membrane constant" may be replaced with a factor which includes dt, $g_c$, α and μ.

$$k_m = g_c/\alpha\mu \, dt \qquad \text{Eq. 15}$$

$$\Delta P_n = \frac{v}{k_m} = \frac{v}{g_c/\alpha\mu\pi t} = \frac{\alpha\mu \, v\Delta t}{g_c}$$

or, $$dP/dt = (\alpha\mu v/g_c) \qquad \text{(Equation 14)}$$

Solving equation 15 for α, we find, $$\alpha = (g_c/k_m \mu dt) \qquad \text{(Eq. 16)}$$

As previously noted, values of $k_m$ for my device range from 1 to $5 \times 10^{-8}$ cm³/gm/sec. For a membrane with a flux of 1 M³/M²/day, $k_m = 3.4 \times 10^{-8}$. It is believed that the thickness of the active layer or skin of the membrane is 0.25 microns or $2.5 \times 10^{-5}$ cm. Entering this value for dt, we find, $$\alpha = \frac{981 \frac{cm}{sec^2}}{\frac{3.4 \times 10^{-8} \, gm^3}{gm \cdot sec} \times \frac{0.01 \, gm}{sec \cdot cm} \times 2.5 \times 10^{-5} \, cm}$$

$$\alpha = 1.1 \times 10^{17} \, cm^{-2}$$

As noted above, the values of α for several available porous substrates range from $2.7 \times 10^5$ to $6.2 \times 10^8$ cm⁻². The value of α for membranes is therefore substantially greater than that of core substrate, further confirming that the vast majority of pressure drop in a properly design balanced pressure tubular RO core is in the surface of the membrane.

From the above analyses, the following effects can be shown:

1. For large cores with high fluxes and low feed pressures, it is beneficial to omit row n=1, and to use m=5 for rows n=2 and n=3.
2. There is no significant benefit from using m=5 in rows n=4 and beyond, provided that a suitable balance of internal flow rate and viscous resistance coefficient can be achieved.
3. By a judicious balance of the several operational, material and design parameters, a range of conditions can be established in which neither (1) high parasitic pressure drops nor (2) high instantaneous pressure drops in the area of the membrane occur.
4. For substrates with viscous resistance coefficients in excess of $10^9$ or $10^{10}$/cm², excessive parasitic pressure drops may be anticipated.

Figure 34:
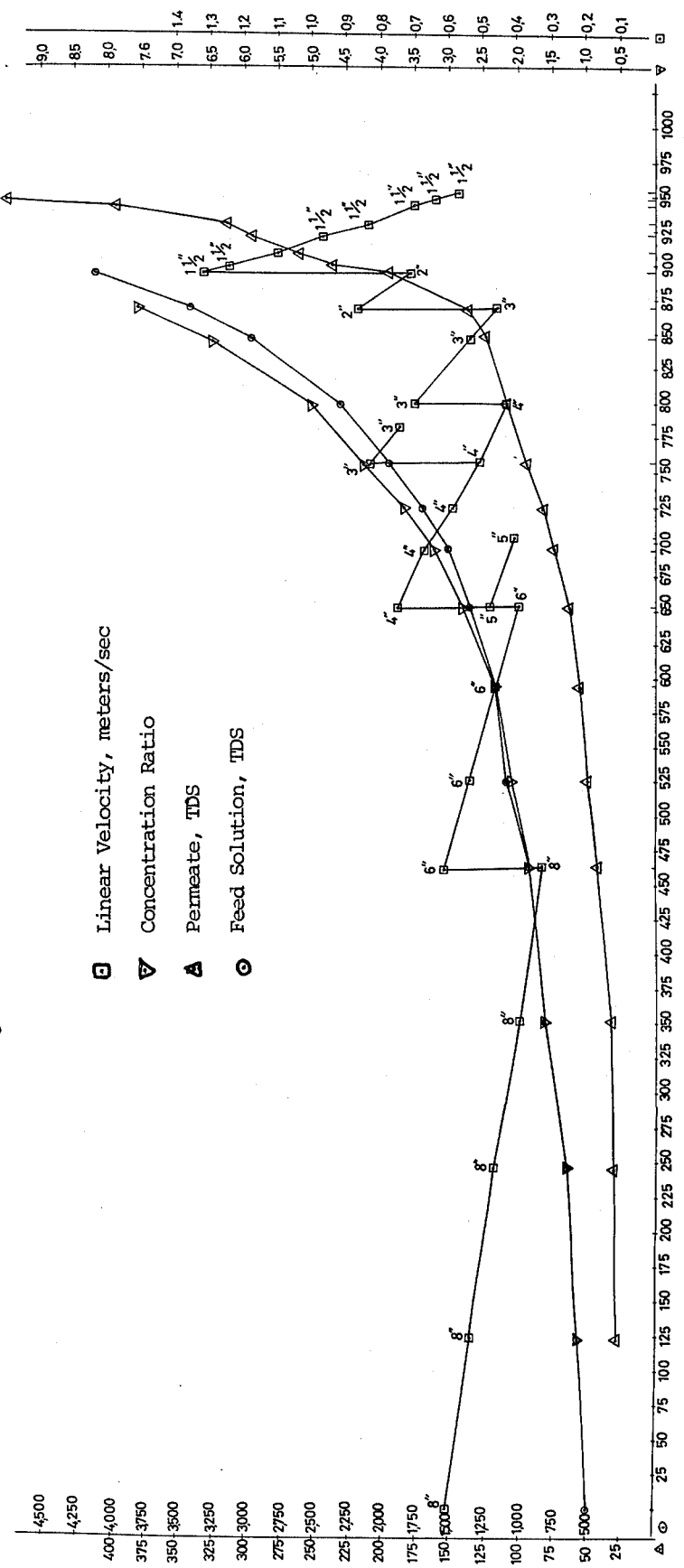
FIG. 34 Graphic representation of 1,000 Ton per day industrial waste stream from Table V.

In order to demonstrate the practical benefit of the broad range of sizes of pressure vessels, Table V illustrates the treatment of an industrial waste stream of 1,000 cubic meters per day. The results are shown on Graph 1, herein identified as FIG. 34.

With feed solutions possessing low to medium fouling tendancies, it has been found beneficial to maintain a minimum linear velocity of 0.38 meters per second (1.26 ft/sec.) With more difficult mixtures, or as the concentration ratio increases, (depending upon the fouling characteristics of the stream being treated), the minimum linear velocity should be increased.

Each of the first four entries in Table V represent two 8" pressure vessels, six meters long, each containing six cores of the type shown in Table I, entry 17. Each core is 0.97 meters long, plus couplers, so that each pressure vessel contains 5.8 meters of core, the remaining 20 cm. being taken up with connections and space for remixing the feed solution. In this example, the initial feed entered the first pressure vessel with a linear velocity of 0.61 Meters/sec. and left the eighth pressure vessel at 0.33 Meters/sec. Then, using the principle shown in FIG. 26, the diameter of the pressure vessel was decreased from 8" to 6", using a reducer in conjunction with a 180° return. The linear velocity of the feed was thereby

TABLE V

| Entry No. | Q | TDS | V | P | ΔP | Cell Considerations Size and No. | M² × Flux = Perm. | TDS | Q | TDS | V | P | ΔP | % Perm. | Conc. Ratio | Cumulative Permeate |
|---|---|---|---|---|---|---|---|---|---|---|---|---|---|---|---|---|
| 1 | 1,000 | 500 | 0.61 | 70 | .06 | →2×8" | 80.7×1.47 =119 | 27.5 | 881 | 564 | 0.54 | 69.94 | x | | 1.14 | 119 |
| 2 | 762 | 647 | 0.47 | 69.9 | x | ⌐2×8" | 80.7×1.47 =119 | 31.0 ← | 881 | 564 | 0.54 | 69.94 | .04 | 5.5 | 1.31 | 238 |
| 3 | 762 | 647 | 0.47 | 69.9 | .03 | └→2×8" | 80.7×1.42 =115 | 35.6 | 647 | 756 | 0.40 | 69.87 | x | 5.5 | 1.55 | 353 |
| 4 | 537 | 902 | 0.33 | 69.85 | x | ⌐2×8" | 80.7×1.36 =110 | 41.6 ← | 647 | 756 | 0.40 | 69.87 | .02 | 5.5 | 1.86 | 463 |
| 5 | 537 | 902 | 0.62 | 69.85 | .06 | └→2×6" | 44.7×1.43 =64 | 49.6 | 473 | 1017 | 0.54 | 69.79 | x | 5.5 | 2.11 | 527 |
| 6 | 409 | 1167 | 0.47 | 69.75 | x | ⌐2×6" | 44.7×1.43 =64 | 55.9 ← | 473 | 1017 | 0.54 | 69.79 | .04 | 5.5 | 2.44 | 591 |
| 7 | 409 | 1167 | 0.47 | 69.75 | .03 | └→2×6" | 44.7×1.39 =62 | 64.2 | 347 | 1364 | 0.40 | 69.72 | x | 5.5 | 2.88 | 653 |
| 8 | 293 | 1601 | 0.41 | 69.42 | x | 2×5" | 38.2×1.45 =54 | 76.4 | 374 | 1364 | 0.48 | 69.72 | .03 | 5.6 | | |
| 9 | 310 | 1518 | 0.67 | 69.12 | x | ⌐2×4" | 25.4×1.45 =37 | 75.0 ← | 347 | 1364 | 0.75 | 69.72 | .06 | 5.5 | 3.23 | 690 |
| 10 | 310 | 1518 | 0.67 | 69.12 | .06 | └→2×4" | 25.4×1.45 =37 | 83.5 | 273 | 1712 | 0.59 | 69.06 | x | 5.5 | 3.66 | 727 |
| 11 | 236 | 1966 | 0.51 | 69.01 | x | ⌐2×4" | 25.4×1.45 =37 | 94.2 ← | 273 | 1712 | 0.59 | 69.06 | .05 | 5.5 | 4.24 | 764 |
| 12 | 236 | 1966 | 0.51 | 69.01 | .04 | └→2×4" | 25.4×1.40 =36 | 110.1 | 200 | 2300 | 0.43 | 68.97 | x | 5.6 | 5.0 | 800 |
| 13 | 236 | 1966 | 0.83 | 69.01 | 0.10 | 2×3" | 15.8×1.45 =23 | 106.2 | 213 | 2167 | 0.75 | 68.91 | x | 5.4 | | |
| 14 | 154 | 2950 | 0.54 | 68.85 | x | ⌐4×3" | 31.6×1.45 =46 | 124.2 ← | 200 | 2300 | 0.70 | 68.97 | .12 | 5.4 | 6.49 | 846 |
| 15 | 154 | 2950 | 0.54 | 68.85 | .04 | └→2×3" | 15.8×1.40 =22 | 165.2 | 132 | 3414 | 0.46 | 68.81 | x | 5.6 | 7.58 | 868 |
| 16 | 108 | 4129 | 0.71 | 68.63 | x | ⌐4×2" | 16.8×1.45 =24 | 194.6 ← | 132 | 3414 | 0.87 | 68.81 | .18 | 5.7 | 9.26 | 892 |
| 17 | 108 | 4129 | 1.32 | 68.63 | .20 | └→2×1½" | 4.0×1.45 =6 | 235.4 | 102 | 4358 | 1.25 | 68.43 | x | 5.7 | 9.80 | 898 |
| 18 | 90 | 4905 | 1.10 | 68.09 | x | ⌐4×1½" | 8.0×1.45 =12 | 252.7 ← | 102 | 4358 | 1.25 | 68.43 | .34 | 5.8 | 11.11 | 910 |
| 19 | 90 | 4905 | 1.10 | 68.09 | .26 | └→4×1½" | 8.0×1.40 =11 | 294 | 79 | 5547 | 0.97 | 67.83 | x | 6.0 | 12.66 | 921 |
| 20 | 68 | 6390 | 0.83 | 67.60 | x | ⌐4×1½" | 8.0×1.40 =11 | 338.4 ← | 79 | 5547 | 0.97 | 67.83 | .23 | 6.1 | 14.71 | 932 |
| 21 | 68 | 6390 | 0.83 | 67.60 | .15 | └→4×1½" | 8.0×1.35 =11 | 396.2 | 57 | 7567 | 0.70 | 67.45 | x | 6.2 | 17.54 | 943 |
| 22 | 52 | 8249 | 0.64 | 67.38 | x | ⌐2×1½" | 4.0×1.35 =5 | 476.7 ← | 57 | 7567 | 0.70 | 67.45 | .07 | 6.3 | 19.23 | 948 |
| 23 | 52 | 8249 | 0.64 | 67.38 | .05 | └→2×1½" | 4.0×1.30 =5 | 536.2 → | 47 | 9070 | 0.57 | 67.33 | x | 6.5 | 21.28 | 953 |

Q is Quantity of feed or concentrate in M³/day: TDG is Total Disolved Solids in ppm: V is linear velocity of fluid in Meters per second: P is pressure in Kg/cm²: ΔP is pressure drop in kg/cm²: Flux is given in M³/M² of membrane surface: Perm. is quantity of permeate in M³/day: % Perm. is percent permeation which is the same as 100% minus percent rejection: Conc. ratio is concentration ratio, or Volume of initial feed divided volume of concentrate at each stage of the calculations: Cumulative Permeate is the volume of permeate from a given plus the volume of permeate from all upper entries.

increased from 0.33 to 0.62 Meters/sec.

The next three entries show the feed solution progressing through six pressure vessels of the 6" size, with the linear flow rate dropping from 0.62 to 0.40 Meters/second. Entries 8 and 9 show alternate options for the next stage. With the 5" pressure vessel, the linear velocity was only increased to 0.48 Meters/second and, after passing through only two 5" vessels, it had dropped to 0.41 Meters per second. For reasons of standardization, it is beneficial to limit the total number of possible sizes of cores. Therefore, entry 9 shows a more suitable selection for the next stage. In this entry it is seen that the linear velocity increases from 0.40 Meters/second (from the last 6" vessel) to 0.75. After eight pressure vessels, it drops to only 0.43 Meters/second (entry 13).

These two options can also be seen in Graph 1. Above the 653 Tons per day entry on the horizontal coordinate, there are two entries for velocity, one for the 5" pressure vessel and one for the 4". The calculated velocity after the two 5" cells is shown above the 707 ton per day entry.

Again, at entries 12 and 13 a choice must be made between passing through another two 4" pressure vessels or dropping down to a 3" pressure vessel. The effect is shown on Graph 1 above the 800 and 823 ton per day permeate entries. In this case, the decision as to which size to use for the next stage did not turn on the question of the linear velocity of the next stage. It had emerged from the previous 4" vessel with a velocity of 0.51 Meters/second and only dropped to 0.43 after passing through another two vessels. By changing to 3" it would have risen to 0.83 Meters/second and would have only dropped to 0.75 after two 3" vessels. Either course could have been beneficial, based upon the prior applications engineering data on the particular stream being treated. If it possessed a relatively high fouling tendency, it would have been proper to have changed to the 3" pressure vessels at this point, rather than waiting until entry 14, where the change was actually effected.

Next, after passing through six 3" pressure vessels (entries 14 and 15), the pressure vessel size was further reduced to 2" (entry 16) for four pressure vessels. Finally (entry 17), the pressure vessel size was reduced to 1½".

After passing through two 1½" pressure vessels, a concentration ratio of approximately 10:1 was achieved (entry 17). If a concentration ratio of 15:1 is required, an additional twelve 1½" vessels (entries 18, 19 and 20) are required. To achieve a 20:1 concentration ratio with this feed, eight more 1½" pressure vessels (entries 21, 22 and 23) are required.

Having thus illustrated the fact that not all sizes of pressure vessels provide beneficial results, Table VI shows eleven of the entries previously given in Table I. In this case, I have shown the ratios of the membrane areas and the ratios of linear velocities of the adjacent entries. The minimum and maximum ratios of membrane areas are 1.61 and 2.45 and the minimum and maximum ratios of velocities are 1.61 and 2.40. Ratios larger than these would introduce excessive gaps in capabilities for treating feed solutions and, as shown in the case of the 5" vessel (Table II, entry 8), smaller gaps cannot be justified because they do not sufficiently improve treating capacity.

Tables I and VI are based upon designs in which m is always 6. However, as noted above, for higher fluxes and, especially, for large diameter cores, it is beneficial to use cores in which $m=5$ for the central rows. The left half of FIG. 27 shows a core in which there is no row $n=1$, and, for $n=2$ and $n=3$, $m=5$. Nonetheless, the entries in Tables I and VI are substantially correct. The deletion of one to four tubes results in a very small decrease in relative membrane area.

vessel of this size would have the effect of eliminating 758 smaller pressure vessels, and an equivalent reduction in crossover castings (42), return headers (43), retainer flanges (45), permeate collectors (41) and permeate delivery tubes, plus 2,274 pipe couplers (44). A comparable savings in the frames and supports for the pressure vessels is also realized with the larger sizes of cores.

Thus it is seen that cost reductions can be realized by this technique which may make reverse osmosis practical for sewage treatment and water reuse in a medium sized city.

It is also significant to consider the cost effectiveness of the stainless steel employed in the fabrication of the pressure vessels. Table VII shows the comparative relationships of the weight of steel required to house one square meter of membrane surface in the various sizes of pressure vessels previously described in Table VI. For comparison, three different designs of conventional external pressure 7-core devices are shown at the bottom of Table VII. This table shows that, for a 2½ inch schedule 40 conventional external pressure design, 24.2 kg of pressure vessel is required for each meter of membrane, whereas only 2.86 kg is required for a 36 inch pressure vessel fabricated in accordance with the principles of my invention.

TABLE VII

| Pipe Size (nominal) | Schedule | kg/M | M²/M | kg/M² |
|---|---|---|---|---|
| 1½ | 5S | 1.90 | 0.36 | 5.78 |
| 1½ | 10S | 3.11 | 0.35 | 8.89 |
| 2 | 5S | 2.39 | 0.74 | 3.23 |
| 2 | 10S | 3.93 | 0.72 | 5.46 |
| 2 | 40 | 5.65 | 0.70 | 8.07 |
| 3 | 40 | 11.3 | 1.36 | 8.31 |
| 4 | 40 | 16.1 | 2.19 | 7.35 |
| 6 | 40 | 28.3 | 4.16 | 6.80 |
| 8 | 40 | 42.6 | 6.93 | 6.15 |
| 12 | 40 | 79.8 | 17.0 | 4.69 |
| 18 | 40 | 156.1 | 35.6 | 4.38 |
| 24 | 40 | 255.1 | 61.1 | 4.18 |
| 36 | 40 | 421.0 | 147 | 2.86 |
| 48 | 80S* | 378.2 | 270 | 1.40 |
| 2* | 10S | 3.93 | 0.356 | 11.0 |
| 2½** | 5S | 3.69 | 0.356 | 10.4 |
| 2½** | 40 | 8.63 | 0.356 | 24.2 |

*Data not available on 48 inch pipe with equivalent pressure capability as for the 36 inch size.
**Entries for conventional external pressure/reverse osmosis designs.

TABLE VI

Practical Sizes, Area Ratios and Velocity Ratios

| Nominal Pipe Size (inches) | Pipe Schedule | Number of tubes | Approx. I.D., cm. | Membrane area, M²/M | Area Ratio, lower entry/ upper entry | Flow Rate, M³/day at 0.38 M/sec. or 1.25 ft/sec. | Velocity Ratio, lower entry/ upper entry |
|---|---|---|---|---|---|---|---|
| 1½" | 5S | 6 | 1.2 | 0.36 | | 31.1 | 1.86 |
| 2" | 5S | 18 | 1.0 | 0.74 | 2.06 | 57.8 | 1.89 |
| 3" | 40 | 36 | 1.0 | 1.36 | 1.61 | 109 | 1.61 |
| 4" | 40 | 60 | 1.0 | 2.19 | 1.90 | 175 | 2.05 |
| 6" | 40 | 126 | 1.05 | 4.16 | 1.67 | 358 | 1.67 |
| 8" | 40 | 210 | 1.05 | 6.93 | 2.45 | 597 | 2.33 |
| 12" | 40 | 540 | 1.0 | 17.0 | 2.09 | 1,390 | 2.10 |
| 18" | 40 | 1134 | 1.0 | 35.6 | 1.72 | 2,920 | 1.71 |
| 24" | 40 | 1944 | 1.0 | 61.1 | 2.40 | 5,010 | 2.40 |
| 36" | 40 | 4674 | 1.0 | 147 | 1.84 | 12,000 | 1.83 |
| 48" | 80S | 8580 | 1.0 | 270 | | 22,100 | |

It might appear to be impractical to consider the fabrication of cores as large as 48 inches. However, a comparison of the economical considerations will reveal that there is a substantial incentive in producing such a core. One conventional external pressure core has a membrane area of 0.046 M² and a commercial value of 3,450 or US$11.50. One meter of 7-core pressure vessel contains 0.356 M² of membrane with a value of 26,416 or US$88.05. One Meter of 48" core, as shown in Table I, entry 43, has 270 M² of membrane surface or 758 times as much membrane, and could replace conventional external pressure cores costing 20,035,000 or US$66,800. In addition, each pressure It is also noteworthy that, with larger pressure vessel sizes, further economies may be effected by use of mild steel pipe with epoxy or a similar internal coating. While these coatings have proved somewhat unreliable with smaller pressure vessels, these vessels are large enough to permit an operator to enter the vessel to inspect for and correct defects.

It is also possible to fabricate the pressure vessels with stainless clad (stainless lined) pipe, substantially reducing the weight of costly stainless steel, without losing its beneficial corrosion resistant properties.

Figure 31:
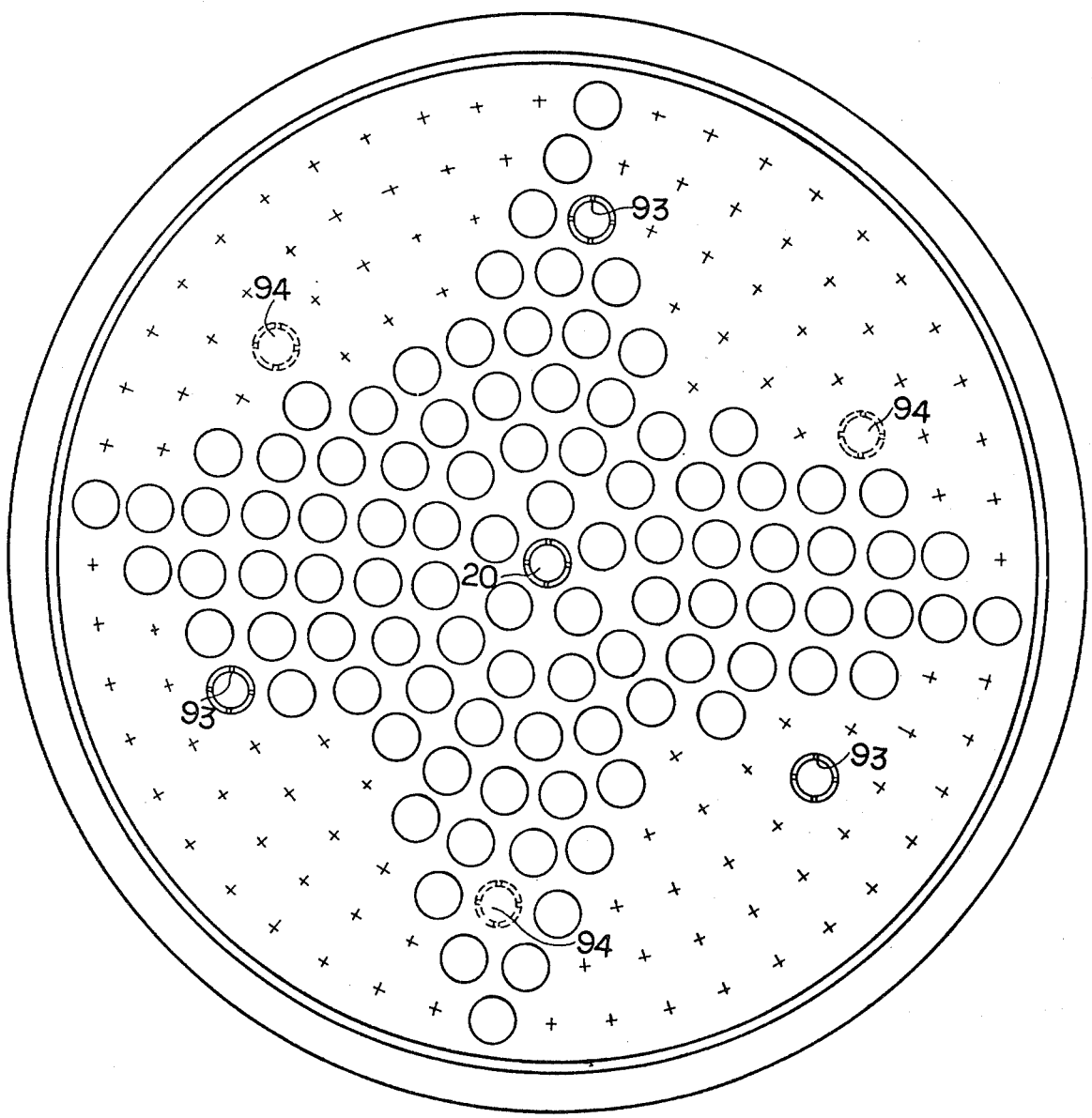
FIG. 31. Device with additional axial permeate ducts.

In those cases in which a balance of internal pressure drop cannot be established by core design and material selection, it is possible to introduce additional axial permeate ducts, 93, as shown in FIG. 31.

In this figure, an 8" core is shown with three additional permeate ducts in row n=6, placed 120° apart, and three optional ducts, 94, at intermediate angles in the same row. For very large sizes with high values of $\alpha$, additional permeate ducts may be provided in rows beyond that shown. It must be recognized, however, that this technique introduces unbalanced mechanical forces in the zone between these axial ducts and the adjacent tubes.

On installation, the several axial permeate ducts may be coupled directly to the corresponding duct from the adjacent core; they may then be interconnected at the first core in the pressure vessel. Or, for cores in which space limitations would make it difficult to couple more than one duct, the several ducts may be interconnected at each face of each core, reducing to one the number of connections required at the time of installation.

Another way in which a balance in pressure drop can be established is by placing small radial ducts, 95, in the porous substrate, as illustrated in FIG. 32. In such a case, the staggered placement of tubes shown in Table II cannot be used. These ducts may then be placed 60° apart, provided, of course, that m=6 for the entire core.

Again it is recognized that this technique introduces unbalanced mechanical forces between the radical ducts and the tubes between which they pass.

These ducts can be made in several manners. In one method, small radial rods are placed in the core mold prior to casting the core, with one end extending outside the mold. These are removed after fabrication, and the resulting holes, 96, plugged. In another effective method, small rods of a water soluble organic substrate, such as high molecular weight polyethylene glycol, or an inorganic substance such as NaCl or $Na_2SO_4$, are placed in some of the perforations of the permeate duct prior to fabrication of the core. When placed in service, the water soluble substrate gradually leaches away, leaving the desired radial permeate duct. In a third method, suitable for low temperature core fabrication methods, a waxy or crystaline substance can form the duct and it may be melted out of the core after curing. In all of these cases, it is beneficial to secure the rods in the proper position by wiring or otherwise attaching them to the mandrels forming several of the tubes prior to casting the core.

Since the principle objective of the radial ducts is to increase the ease with which permeate from the outer portions of a core reaches the central permeate duct, it is possible to use a small diameter metal tubing, with or without perforations, to assist in withstanding the unbalanced compressional forces generated by the placement of these ducts in the core substrate. Such a duct liner would have one or more orifices within the axial permeate duct to facilitate delivering permeate thereto. To prevent the open end of these tubes from becoming plugged during fabrication, a water soluble plug of organic or inorganic substance may be placed in the ends prior to casting.

For cores requiring radial permeate ducts, the number of these ducts required per linear section of core increases with the increasing diameter of the core. It is not practical to employ radial permeate ducts at intermediate angles. However, this method may be combined with the use of axial permeate ducts, 93, at intermediate angles, as shown at 30°, 90°, 150°, 210°, 270° and 330° of FIG. 33.

Figure 33:
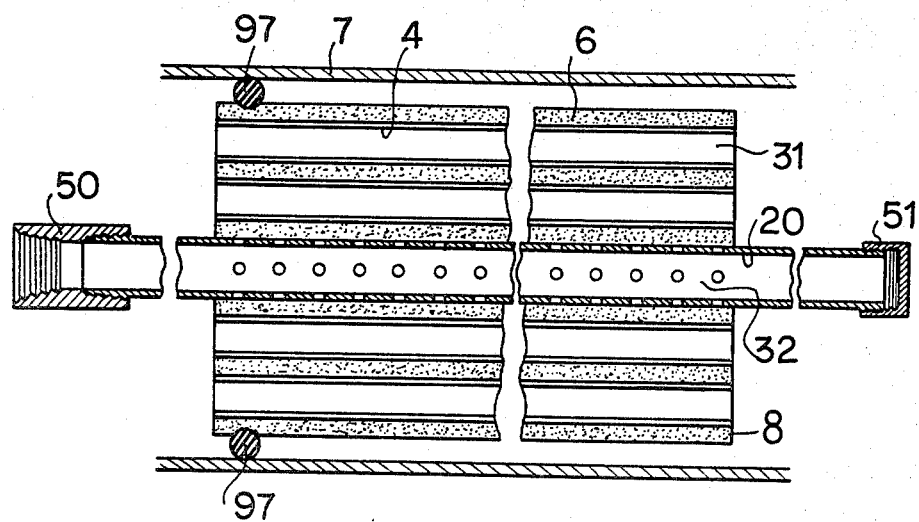
FIG. 33. The device of FIG. 21 with external "O" ring gasket to prevent flow around outer surface of core.

Finally, in those cases in which no external membrane, 5, is used, and when maximum pumping efficiency is desired, it is desirable to prevent flow of fluid over the external surface of the core. This objective is achieved by the installation of an "O" ring, item 97, or other gasket on the outer surface of the core, as illustrated in FIG. 33. In this manner, fluid pressure continues to be exerted on the outer surface of the core, while all of the fluid flow is directed through the internal tubes. The installation of the core is facilitated by the use of molybdenum disulfide powder, or a suitable amorphous lubricant such as a soft grade of petrolatum or silicone base grease.

BIBLIOGRAPHY OF KNOWN PRIOR ART

I. Patent References

| Patents, American | | | Patents, Japanese | | |
|---|---|---|---|---|---|
| 1. | Loeb | 3,133,132 | 1. | Loeb | 42-2818 |
| 2. | Loeb | 3,133,137 | 2. | Mahon | 44-14215 |
| 3. | Loeb | 3,170,867 | 3. | Merten | 46-19806 |
| 4. | Loeb | 3,283,042 | 4. | Huggins | 39-30143 |
| 5. | Loeb | 3,364,288 | 5. | Cahn | 44-9443 |
| 6. | Merten | 3,386,583 | 6. | Strand | 45-36724 |
| 7. | Westmoreland | 3,367,504 | 7. | Hanzawa | 46-484 |
| 8. | Bray | 3,367,505 | 8. | Donokos | 46-21444 |
| 9. | Loeb | 3,446,359 | 9. | Comers | 46-38963 |
| 10. | Shippey | 3,400,825 | 10. | Mahon | 39-28625 |
| 11. | Block | 3,768,660 | 11. | Geory | 44-5526 |
| | | | 12. | Merten | 45-13933 |
| | | | 13. | Merten | 46-9804 |
| | | | 14. | Michaels | 44-18730 |
| | | | 15. | Bray | 45-1174 |
| | | | 16. | Shirokawa | 45-13935 |
| | | | 17. | Signa | 36-10866 |
| | | | 18. | Block | 48-96459 |
| | | | 19. | Block | 48-96460 |
| | | | 20. | Saito | 49-48074 |
| | | | 21. | Baldon | 51-64481 |

II. References from Literature

R-1. S. Sourirajan, "Reverse Osmosis", Academic Press, New York, (1970)

R-2. R. E. Lacey & S. Loeb, "Industrial Processing with Membranes", Wiley-Interscience, a Div. of John Wiley & Sons, Inc., New York, (1972)

R-3. S. Kinura, H. Ohya, S. Suzuki, "Reverse Osmosis Systems, Membrane Separation Technology", Shokuhin Kogyo Gijutsu Ohosakai, (Food Industry Technology Research Association of Tokyo) (1973)

R-4. Joseph W. McCutchan and Douglas N. Bennion, "Saline Water Demineralization by Means of a Semipermeable Membrane" Saline Water Research Progress Summary, Jan. 1, 1970–Dec. 31, 1970, Water Resources Center Desalination Report No. 40, School of Engineering and Applied Science, University of California at Los Angeles, p.p. 1–10

R-5. Dieter Landolt, "Interfacial Phenomena on Reverse Osmosis Membranes", ibid p.p. 23–25.

R-6 J. W. McCutchan & J. Glater, "Scale Control Studies", ibid p.p. 27–35.

R-7 K. S. Murdia, J. Glater & J. W. McCutchan, "Hemihydrate Scaling Threshold Enhancement by Magnesium Ion Augmentation" Water Resources Center Desalination Report No. 49, April 1972, School of Engineering and Applied Science, University of California at Los Angeles.

R-8. J. M. Jackson & D. Landolt, "About the Mechanism of Formation of Iron Hydroxide Fouling Layers on Reverse Osmosis Membrane", Water Resources Center Desalination Report No. 50, September 1972, School of Engineering and Applied Science, University of California at Los Angeles.

R-9 D. Antoniuk & J. W. McCutchan, "Desalting Irrigation Field Drainage Water by Reverse Osmosis, Firbaugh, Calif.", Water Resources Center Desalination Report No. 54, August 1973, School of Engineering and Applied Science, University of California at Los Angeles.

R-10. J. W. McCutchan, D. Antoniuk, G. Chakrabarti, M. Chan, V. Goel, N. K. Patel & E. Selover, "Saline Water Demineralization by Means of a Semipermeable Membrane", Water Resources Center Desalination Report No. 57, Progress Report, Jan. 1, 1973 to June 30, 1974, Department of Chemical Engineering, University of California, Berkley and School of Engineering and Applied Science, University of California, Los Angeles. p.p. 55–68

R-11. J. W. McCutchan, J. Glater, R. Dooly & M. Adler, "Scale Control Studies", ibid p.p. 73–87

R-12. M. S. Adler, J. Glater 6 J. W. McCutchan, "Gypsum Solubility and Scaling Limits in Saline Waters", Water Resources Center Desalination Report No. 59, January 1975, School of Engineering and Applied Science, University of California at Los Angeles.

R-13. M. B. Kim-E & J. W. McCutchan, "Reclamation of Hyperion Secondary Effluent by Reverse Osmosis", Water Resources Center Desalination Report No. 60, June 1975, School of Engineering and Applied Science, University of California at Los Angeles.

R-14. J. W. McCutchan, D. Antoniuk, V. Goel, M. Chan, M. B. Kim-E, R. Reddy & E. Selover, "Saline Water Demineralization by Means of a Semipermeable Membrane; Firbaugh Agricultural Wastewater Desalting", Water Resources Center Desalination Report No. 62, Progress Report, July 1, 1974–June 30, 1975, Sea Water Conversion Laboratory, University of California, Berkeley and School of Engineering and Applied Science, University of California, Los Angeles, p.p. 25–34.

R-15. "Colorado River Desalting at LaVerne, California", ibid p.p. 34–40

R-16. "Further Research on Cellulose Acetate Membranes", ibid p.p. 40–47

R-17. M. C. Porter, P. Schrafler and P. N. Rigopulos, "By-Product Recovery by Ultrafiltration", Industrial Water Engineering, Vol 8, Number 6, p.p. 18–24, June/July 1971.

R-18. C. Dean Spatz, "Reverse Osmosis Reclamation Systems for the Plater", *Finishers Management*, July 1971.

R-19. Vincent T. Burns, Jr., "Reverse Osmosis Cuts Solids", Water & Wastes Engineering, 1974.

R-20. Radovan Kohout, "Operating History of a 324,000 pgd RO plant", Industrial Water & Engineering Conference, Mar. 14–16, 1973.

R-21. Doyle, Boen and L. Johansen "Reverse Osmosis of Treated and Untreated Secondary Sewage Effluent", National Environmental Research Center, Office of Research and Development, United States Environmental Protection Agency, Report EPA-670/2-74-077, September 1974.

R-22. Nickelson, Birkhimer, Coverdell, Lai and Wang, "Membranes for Reverse Osmosis by Direct Casting on Porous Supports", U.S. Dept. of the Interior, Office of Saline Water, R & D Progress Report 520, March 1970.

III. Reference from Commercial Literature

C-1. "Reverse Osmosis Systems for Industrial Water Purification and Waste Treatment", Roga Division Universal Oil Products Company, Catalog, 1976.

C-2. "Design Manual for Du Pont Permasep Reverse Osmosis Systems", Permasep Products Division, E. I. du Pont de Nemours & Co., Inc., 1974.

C-3. "Pollution Control and By-Product Recovery for the Pulp and Paper Industry", Bulletin FS-3, Fluid Sciences Division, Universal Oil Products Company, 1975.

C-4. "Membrane Separations for the Dairy Industry", Bulletin FS-4 Fluid Sciences Division, Universal Oil Products.

C-5. "Reverse Osmosis and Ultrafiltration, an Emerging Technology for Liquid Separations", Bulletin FS-2, Fluid Sciences Division, Universal Oil Products.

C-6. "Philco Ford Reverse Osmosis", Product Bulletin 101.

C-7. "Reverse Osmosis Advanced Tubular Technology Offering Unparalleled Versatility in Processing Liquids", Liquid Process Products Division, Philco-Ford Corporation, Catalog B-101, August 1971.

C-8. "Westinghouse Reverse Osmosis Systems . . . Pure Water for Industry", Catalog B-160, Heat Transfer Division, Lester Branch, Westinghouse Electric Corporation.

C-9. "Ultrafiltration Westinghouse Membrane Systems . . . End Paint Loss and Water Pollution Problems", Bulletin SA 471-2, ibid.

C-10. "Reverse Osmosis Westinghouse Membrane Systems Cut Soluble Oil Costs", Bulletin SA 471-3, ibid.

C-11. "Reverse Osmosis & Ultrafiltration Westinghouse Membrane Systems recover Valuable By-products from Cheese Whey", Bulletin SA 471-4, ibid.

C-12. "Reverse Osmosis Systems", Catalog 3190-1, Patterson Candy International Ltd., 1976.

C-14. "Reverse Osmosis", Catalog No. 9000a, Raypak, Inc., 1971.

C-15. "Reverse Osmosis & Ultrafiltration" Catalog No. 9001a, Rev-O-Pak, Inc., 1975.

C-16. "Pollution Control and Waste Recovery of Water Soluble Oil and Synthetic Lubricant Coolants" Catalog No. 9300, Rev-O-Pak, Inc.

C-17. "Sumitomo ROpak" Catalog "Sumiko 51.6 3T" Sumitomo Jukikai, 1976.

C-18. "Sumitomo/ROpak Reverse Osmosis" Catalog "Sumiko 76.9," Sumitomo Heavy Industries, 1976.

C-19. "Pollution Control at Electroplating Wastes by Reverse Osmosis" Catalog No. 9301, Rev-O-Pak, Inc.

Having thus explained my invention, I claim:

1. A tubular membrane filtration device in which a semiporous core has one or more internal passages with semipermeable membrane coated surfaces and one or more internal permeate ducts without membrane, said core being positioned in an outer pressure vessel, each permeate duct communicating with the outside of said pressure vessel to facilitate the discharge of permeate, and in which two different grades of semiporous substances are employed, the semiporous substance surrounding each permeate duct for a depth of at least 0.5 centimeters possessing a relatively low void volume, a relatively high bulk modulus and/or a relatively small particle size, and in which the balance of the core is composed of a different semiporous substance with a relatively high void volume, a relatively low bulk modulus and/or a relatively large particle size.

2. The device of claim 1 in which coupling devices are permanently sealed into the semiporous core.

3. The device of claim 1 in which the semiporous core is a material selected from the group consisting of a ceramic, sintered glass, sintered plastic, foamed plastic or sintered metal.

4. The device of claim 1 in which the semiporous core is composed of a frit of fused or otherwise consolidated silica, sand, feldspar, clay, diatomaceous earth, or other inorganic mineral or fossil substance.

5. The device of claim 1 in which one or more like cores are installed in series array within a cylindrical pressure vessel, said pressure vessel terminating in generally U-shaped tubing returns, such tubing returns having installed sections of pipe extending through the wall of the U-shaped portion thereof, each such pipe section being coupled directly to the permeate duct of the terminal core in a series array of cores.

6. The device of claim 1 in which each internal permeate duct contains a perforated metal liner having nonperforate end portions extending beyond the ends of the core, said end portions having fittings for connection to a like liner or to a permeate removal tube, a series array of like cores being installed in pipe-like pressure vessels connected by generally U-shaped tubing returns, and in which tubing returns there are installed sections of permeate removal tubing so positioned that they couple directly to the permeate duct of the terminal core in the string of cores within the corresponding pressure vessel.

7. The device of claim 1 in which said installed sections of tubing are coupled via a swivel joint so as to permit rotation of said string of cores during operation.

8. The device of claim 1 in which said swivel joint is coupled to an impeller used to increase the angular velocity of said permeate duct liner and associated cores during operation.

9. The device of claim 1 in which the semiporous core has a circular cross-section and which all membrane coated internal passages have circular cross-sections with radii r, and in which the axes of the membrane coated passages are distributed uniformly on each of a series of concentric circles n, designated by integers progressing from 1 as their radii increase, and in which the number of tubular passages on each such circle is n times m, where m is equal to 0, 5 or 6 when n equals 1 or 2; and where m is 5 or 6 when n equals 3 or more, and where the value of r and the radii of the concentric circles are fixed in such a way that the space between the nearest approach of tubular passages is not less than 0.5 mm.

10. The device of claim 1 in which the semiporous core has a circular cross-section and in which all membrane coated internal passages have circular cross-sections with radii r, and in which the axes of the membrane coated passages are distributed uniformly on each of a series of concentric circles n, designated by integers progressing from 1 as their radii increase, and in which the number of tubular passages on each such circle is n times m, where m equals 0.5 and 6, and where the value of r and the radii of the concentric circles are fixed in such a way that the space between the nearest approach of internal passages is not less than 0.5 mm, and in which auxiliary permeate ducts radiate laterally from the central axial permeate duct through the space between internal membrane coated passages.

11. The device of claim 1 in which a plurality of like cores are connected in a series string by couplers, and in which the couplers between cores in said series string create a spacing of at least 1 centimeter.

12. A tubular molecular filtration device in which a semiporous core has one or more internal passages with semipermeable membrane coated surfaces and at least one internal permeate duct without membrane, the outer surface and end faces of said core being fluid impervious, said core being positioned in an outer pressure vessel, one end of said permeate duct communicating with the outside of said pressure vessel to enable it to discharge permeate, the other end of said duct being either plugged to prevent intrusion of feed solution or connected to other similar cores in a series string, the permeate duct of the terminal core in the series string being plugged to prevent intrusion of feed solution, and in which the cores are fitted with means for interconnecting, a core or string of cores being installed in pressure vessels terminating in 180° tubing returns through which tubing returns there are installed sections of permeate removal tubing so positioned that they may be coupled directly to the permeate duct of said core or terminal core in a string of cores, the diameter of the cores and pressure vessels being staged progressively smaller as the feed solution passes from the feed to the concentrate end of the bank of core-containing pressure vessels so that the velocity of the solution past the membrane surfaces may be controlled in the range above that at which fouling occurs and below that at which pumping efficiency decreases.

13. The device of claim 12 wherein said staging in diameters of cores and pressure vessels is facilitated by the use of tubing reducers connected between pressure vessels and 180° tubing returns at appropriate places within said bank so that the linear flow rates are increased at the points of transition from one diameter to the next smaller diameter.

14. A method for carrying out reverse osmosis or ultrafiltration by using a molecular filtration device consisting of a semiporous core with semipermeable membrane on the outer profile, one or more internal passages with semipermeable membrane coated surfaces and one or more internal permeate ducts without membrane, and wherein said core is fitted with means for interconnecting, said core or a string of cores installed in pressure vessels terminating in 180 degree tubing returns and in which tubing returns are installed sections of pipe or tubing so positioned that they may be coupled directly to said core or terminal core in a string of cores, the diameter of the cores and pressure vessels being staged progressively smaller as the feed solution passes from the feed to the concentrate end of the core bank so that the velocity of the solution past the membrane surfaces may be controlled within the ranges in which the fouling occurs and in which pumping efficiency decreases, said staging in diameters of cores and pressure vessels being facilitated by the use of tubing reducers connected between pressure vessels and bent tubing returns at appropriate places within the core bank so that the linear flow rates are increased at the points of transition from one diameter to the next smaller diameter, said permeate ducts equipped with suitable connectors, with all materials employed in said core, connectors, seals and allied parts being composed of organic substances, in which method a radioactive or toxic substance is treated and concentrated, and in which, after exhaustion of the core or termination of the process, the residual core, and all ot its attached parts are decomposed by a thermal or chemical process, thereby yielding the minimum weight and volume of residual inorganic ash.

15. In a tubular membrane filtration device in which a semiporous core has one or more internal passages with semipermeable membrane coated surfaces and one or more internal permeate ducts without membrane, said core being positioned in an outer pressure vessel, each permeate duct communicating with the outside of said pressure vessel to facilitate the discharge of permeate, the improvement wherein the semiporous core is a material having a viscous resistance coefficient in the range of from about $1 \times 10^5/cm^2$ to not more than $10^9/cm^2$ and wherein the viscous resistance coefficient of said semipermeable membrane is substantially greater than that of said core, whereby the majority of the pressure drop between said internal passages and said permeate ducts occurs at the surface of said membrane with little internal pressure drop in said core, and wherein said pressure vessel comprises a set of serially connected vessel pipes each containing one or more of said cores, and wherein the successive vessel pipes and the cores contained there within are of progressively smaller diameter.

16. A core for a pressure balanced filtration system, comprising:
a generally cylindrical rigid body of porous material, said body having at least one internal passage extending therethrough, each such internal passage having a semipermeable membrane on its surface, said body also having at least one membrane-free duct extending therethrough, swaid body being adapted for mounting within an outer vessel with a space therebetween, so that as a feed solution flows through said internal passages and through the space between said body and the outer vessel, the radially outward forces exerted by said feed solution flowing through said internal passages will be balanced by the radially inward forces of the feed solution flowing through said space between said body and said vessel, in which:
two different grades of semiporous substances are employed to form said body, the semiporous substance surrounding each permeate duct for a depth of at least 0.5 centimeters possessing a relatively low void volume, a relatively high bulk modulus and/or a relatively small particle size, the remainder of the body being composed of a different semiporous substance with a relatively high void volume, a relatively low bulk modulus and/or a relatively large particle size.

17. In a semiporous core for a tubular molecular filtration system, said core having one or more semipermeable membrane lined internal passages adapted for feedthrough of an input fluid and having at least one internal permeate duct without membrane, said permeate duct being connectable to an outlet of said filtration system at a pressure substantially less than the pressure of said inlet fluid so that a compressional force imbalance will exist in the portion of the semiporous core surrounding said permeate duct, the improvement wherein:
said core is formed of two different porous materials, said core portion surrounding said permeate duct and subjected to said compressional force imbalance being formed of a first, relatively higher density porous material, the remainder of said core being formed of a relatively less dense porous material.

* * * * *